(12) United States Patent
Purushothaman et al.

(10) Patent No.: US 11,295,402 B2
(45) Date of Patent: Apr. 5, 2022

(54) BLOCKCHAIN-BASED PROPERTY REPAIR

(71) Applicant: Bank of America Corporation, Charlotte, NC (US)

(72) Inventors: Sasidhar Purushothaman, Hyderabad (IN); Suki Ramasamy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 578 days.

(21) Appl. No.: 15/938,545

(22) Filed: Mar. 28, 2018

(65) Prior Publication Data

US 2019/0304038 A1 Oct. 3, 2019

(51) Int. Cl.
| | |
|---|---|
| G06Q 10/06 | (2012.01) |
| G06Q 50/16 | (2012.01) |
| H04L 9/06 | (2006.01) |
| G06F 16/29 | (2019.01) |
| H04L 29/08 | (2006.01) |
| H04L 67/104 | (2022.01) |

(52) U.S. Cl.
CPC .......... G06Q 50/163 (2013.01); G06F 16/29 (2019.01); G06Q 10/063 (2013.01); H04L 9/0637 (2013.01); H04L 67/104 (2013.01)

(58) Field of Classification Search
CPC .......................... G06Q 50/163; H04L 9/0637
See application file for complete search history.

(56) References Cited

U.S. PATENT DOCUMENTS

| | | |
|---|---|---|
| 5,892,900 A | 4/1999 | Ginter et al. |
| 7,421,372 B1 | 9/2008 | Moss et al. |
| 7,457,763 B1 | 11/2008 | Garrow et al. |
| 7,584,165 B2 | 9/2009 | Buchan |
| 8,285,517 B2 | 10/2012 | Sillman et al. |
| 8,321,468 B2 | 11/2012 | Thomas et al. |
| 8,504,396 B2 | 8/2013 | Quintus et al. |
| 9,092,307 B2 | 7/2015 | Langer et al. |
| 9,298,806 B1 | 3/2016 | Vessenes et al. |
| 9,397,985 B1 | 7/2016 | Seger, II et al. |

(Continued)

OTHER PUBLICATIONS

1. Kei Leo Brousmiche, Digitizing, Securing and Sharing Vehicles Life-cycle over a Consortium Blockchain: Lessons Learned, 2018. Related to an innovative Blockchain-backed Vehicles Data and Processes Ledger framework to digitize the vehicles life-cycle over a consortium Blockchain. (Year: 2018).*

(Continued)

*Primary Examiner* — Maria C Santos-Diaz
(74) *Attorney, Agent, or Firm* — Banner & Witcoff, Ltd.

(57) ABSTRACT

Aspects of the disclosure relate to a blockchain-based approach for managing repair of physical property items. Any full node computing device in a network, including a physical property management computing platform, may register a physical property item onto a blockchain associated with the physical property item. The computing platform may further register one or more users onto this blockchain so that the registered users can use the physical property item. As one or more users use the physical property item, the computing platform may receive real-time usage information and may notify the owner of the physical property item when the item needs to be repaired or replaced. The computing platform may then execute an event based on a response to this notification.

20 Claims, 27 Drawing Sheets

(56) References Cited

U.S. PATENT DOCUMENTS

| | | | |
|---|---|---|---|
| 9,884,069 B2 | 2/2018 | Tabuteau | |
| 9,884,078 B2 | 2/2018 | Harrell | |
| 9,884,152 B2 | 2/2018 | McLoughlin et al. | |
| 9,884,398 B2 | 2/2018 | Choi | |
| 9,884,407 B2 | 2/2018 | Ishikawa et al. | |
| 9,884,615 B2 | 2/2018 | Pandit et al. | |
| 9,884,791 B2 | 2/2018 | Yamashita | |
| 9,884,901 B2 | 2/2018 | Fares et al. | |
| 9,884,907 B2 | 2/2018 | Zeller et al. | |
| 9,884,908 B2 | 2/2018 | Zeller et al. | |
| 9,884,912 B2 | 2/2018 | Garcia-Martinez et al. | |
| 9,884,932 B2 | 2/2018 | Kobilka et al. | |
| 9,884,943 B2 | 2/2018 | Frost et al. | |
| 9,885,073 B2 | 2/2018 | Feldman et al. | |
| 9,885,076 B2 | 2/2018 | Leamon et al. | |
| 9,885,227 B2 | 2/2018 | Leiper et al. | |
| 9,885,258 B2 | 2/2018 | Spoor et al. | |
| 9,885,807 B2 | 2/2018 | Hunt et al. | |
| 9,886,058 B2 | 2/2018 | Zaitsev et al. | |
| 9,886,210 B2 | 2/2018 | Frank et al. | |
| 9,886,270 B2 | 2/2018 | Bestfleisch et al. | |
| 9,886,303 B2 | 2/2018 | Koller Jemio et al. | |
| 9,886,486 B2 | 2/2018 | de Castro Alves et al. | |
| 9,886,496 B2 | 2/2018 | Leininger et al. | |
| 9,886,583 B2 | 2/2018 | Aguayo Gonzalez et al. | |
| 9,886,660 B2 | 2/2018 | Hammerschmidt et al. | |
| 9,886,684 B2 | 2/2018 | Baron | |
| 9,886,707 B1 | 2/2018 | Chang et al. | |
| 9,886,713 B2 | 2/2018 | Borom et al. | |
| 9,886,731 B2 | 2/2018 | Ding et al. | |
| 9,886,810 B1 | 2/2018 | Murphy | |
| 9,886,845 B2 | 2/2018 | Rhoads et al. | |
| 9,887,295 B2 | 2/2018 | Suzawa et al. | |
| 9,887,299 B2 | 2/2018 | Yamazaki et al. | |
| 9,887,555 B2 | 2/2018 | Sultenfuss et al. | |
| 9,887,560 B2 | 2/2018 | Banos et al. | |
| 9,887,561 B2 | 2/2018 | Jouper et al. | |
| 9,887,893 B2 | 2/2018 | Vaswani et al. | |
| 9,887,898 B2 | 2/2018 | Frei et al. | |
| 9,887,899 B2 | 2/2018 | Sturrock et al. | |
| 9,887,900 B2 | 2/2018 | Sturrock et al. | |
| 9,887,934 B2 | 2/2018 | Chaudhari et al. | |
| 9,887,936 B2 | 2/2018 | Maino et al. | |
| 9,887,970 B2 | 2/2018 | Luff et al. | |
| 9,888,067 B1 | 2/2018 | Yemini et al. | |
| 9,888,105 B2 | 2/2018 | Rhoads | |
| 9,888,107 B2 | 2/2018 | Mamdani et al. | |
| 9,888,112 B1 | 2/2018 | Hodge | |
| 9,888,118 B2 | 2/2018 | Lugiai et al. | |
| 9,888,353 B2 | 2/2018 | Reed et al. | |
| 10,740,849 B1* | 8/2020 | Leise | G06F 16/27 |
| 10,742,313 B1* | 8/2020 | Favarolo | H04B 7/18578 |
| 10,853,750 B2* | 12/2020 | Daniel | G06F 16/27 |
| 10,891,686 B1* | 1/2021 | Rao | G06Q 30/0207 |
| 10,956,614 B2* | 3/2021 | Daniel | G06F 21/10 |
| 2016/0098723 A1 | 4/2016 | Feeney | |
| 2016/0210710 A1 | 7/2016 | Glennon | |
| 2016/0260171 A1 | 9/2016 | Ford et al. | |
| 2016/0261404 A1 | 9/2016 | Ford et al. | |
| 2016/0292680 A1 | 10/2016 | Wilson, Jr. et al. | |
| 2017/0024813 A1 | 1/2017 | Crouspeyre et al. | |
| 2017/0046526 A1* | 2/2017 | Chan | G06F 21/645 |
| 2017/0046709 A1 | 2/2017 | Lee et al. | |
| 2017/0116693 A1 | 4/2017 | Rae et al. | |
| 2017/0140375 A1 | 5/2017 | Kunstel | |
| 2017/0178237 A1 | 6/2017 | Wong | |
| 2017/0206532 A1 | 7/2017 | Choi | |
| 2017/0221029 A1 | 8/2017 | Lund et al. | |
| 2017/0232300 A1* | 8/2017 | Tran | H04L 67/10 434/247 |
| 2017/0236094 A1 | 8/2017 | Shah | |
| 2017/0330174 A1 | 11/2017 | Demarinis et al. | |
| 2018/0096175 A1 | 4/2018 | Schmeling et al. | |
| 2018/0108089 A1 | 4/2018 | Jayachandran | |
| 2018/0117447 A1 | 5/2018 | Tran et al. | |
| 2018/0174094 A1 | 6/2018 | Ren et al. | |
| 2018/0189813 A1 | 7/2018 | Neal | |
| 2018/0300671 A1 | 10/2018 | Richardson et al. | |
| 2018/0314258 A1* | 11/2018 | Brew | B60W 30/10 |
| 2018/0314809 A1 | 11/2018 | Mintz et al. | |
| 2018/0315055 A1* | 11/2018 | Pickover | H04L 9/3297 |
| 2018/0322597 A1* | 11/2018 | Sher | H04L 67/22 |
| 2019/0005595 A1 | 1/2019 | Tautenhan et al. | |
| 2019/0044700 A1* | 2/2019 | Leddy | H04L 9/3226 |
| 2019/0050541 A1* | 2/2019 | Wright | H04L 9/3236 |
| 2019/0130394 A1 | 5/2019 | Stollman et al. | |
| 2019/0158270 A1* | 5/2019 | Berti | H04L 9/30 |
| 2019/0171438 A1* | 6/2019 | Franchitti | G06N 5/022 |
| 2020/0042989 A1* | 2/2020 | Ramadoss | G06Q 20/102 |
| 2020/0143300 A1* | 5/2020 | Weldemariam | H04L 9/0637 |
| 2020/0160466 A1* | 5/2020 | Hori | H04L 9/0637 |
| 2020/0213329 A1* | 7/2020 | Simons | G06N 20/00 |
| 2020/0380090 A1 | 12/2020 | Marion | |

OTHER PUBLICATIONS

5. Mendiboure, L., Chalouf, M. A., & Krief, F. (2018). Towards a blockchain-based SD-IoV for applications authentication and trust management doi:http://dx.doi.org/10.1007/978-3-030-05081-8_19- (Year: 2018).*

Waltonchain Team, "Waltonchain White Paper," V 1.0.3, Oct. 9, 2017, retrieved from https://www.waltonchain.org/upload/1507947652573.pdf, 67 pages.

Modum Whitepaper, "Data Integrity for Supply Chain Opertions, Powered by Blockchain Tehcnology," V. 1.0, 2017, retrieved from https://modum.io/.../uploads/2017/08/modum-whitepaper-v.-1.0.pdf, 20 pages.

Aug. 14, 2019—U.S. Notice of Allowance—U.S. Appl. No. 15/938,120.
Jan. 8, 2020—U.S. Non-Final Office Action—U.S. Appl. No. 15/938,184.
Jun. 30, 2020—U.S. Final Office Action—U.S. Appl. No. 15/938,184.
Apr. 3, 2020—U.S. Non-Final Office Action—U.S. Appl. No. 15/938,410.
Aug. 21, 2020—U.S. Final Office Action—U.S. Appl. No. 15/938,410.
Dec. 21, 2020—U.S. Non-Final Office Action—U.S. Appl. No. 15/938,184.
Jan. 4, 2021—U.S. Non-Final Office Action—U.S. Appl. No. 15/938,410.
Apr. 7, 2021—U.S. Non-Final Office Action—U.S. Appl. No. 15/938,410.

* cited by examiner

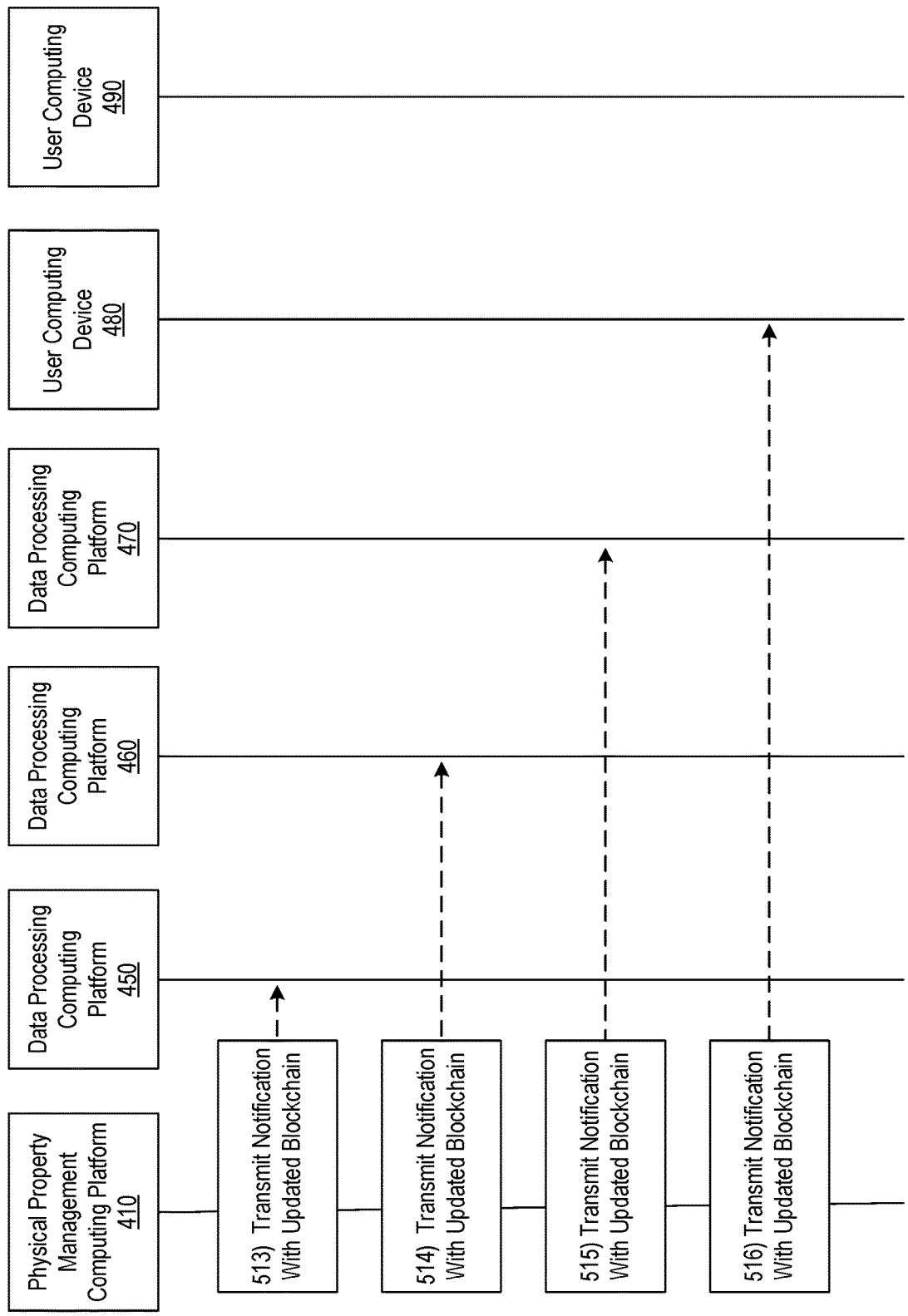

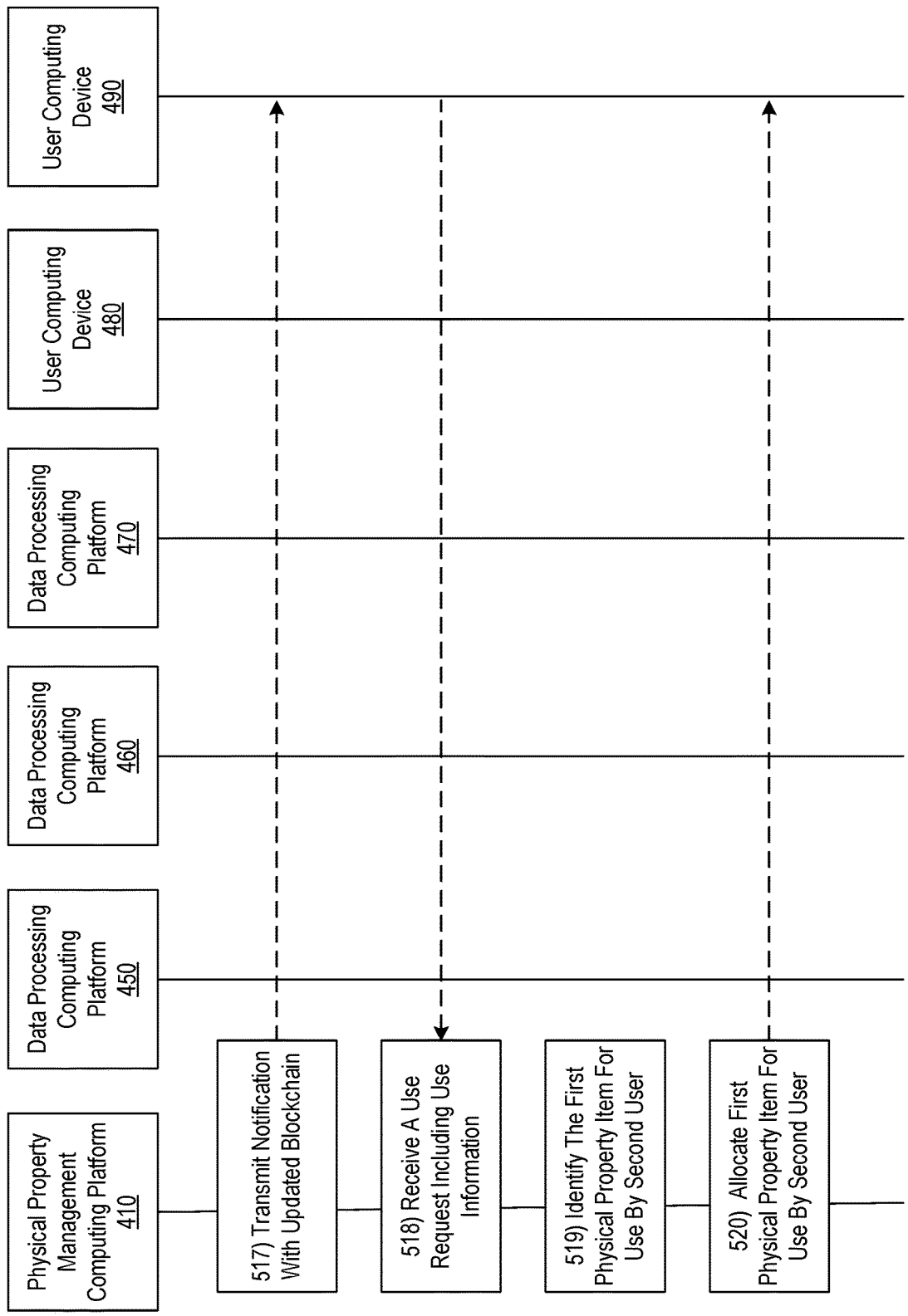

Physical Property Management Computing Platform
*Request for Registration of Physical Property Item*

Date of Registration Request: XX-YY-ZZZZ

Physical Property Item Registration Information: <Enter registration information for the physical property item>

Item Description: <Enter description of physical property item>

Physical Property Item Historical Usage Information: <Enter historical usage information for the physical property item>

Approve   Reject

FIG. 6

Physical Property Management Computing Platform
*Notification That Physical Property Item Is Available For Use*

Date: XX-YY-ZZZZ

Physical Property Item Registration Information: <Enter registration information for the physical property item>

Item Description: <Enter description of physical property item>

The above item is available for use. Please click below to submit a use request for using the above-identified item.

Submit Use Request

FIG. 7

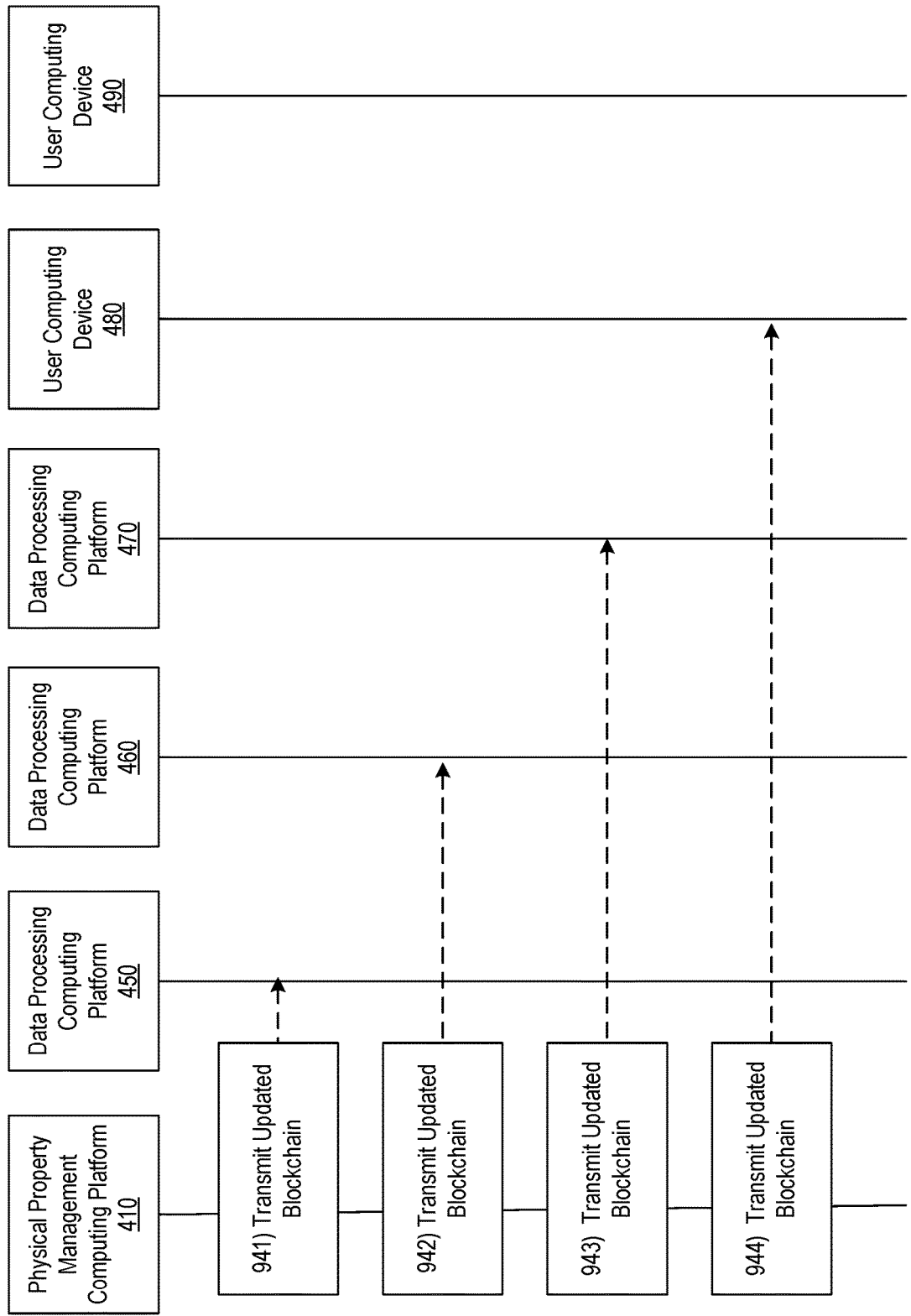

Physical Property Management Computing Platform
*Notification of Need For Repair*

Date of Notification: XX-YY-ZZZZ

Physical Property Item Registration Information: <Enter registration information for the physical property item>

Description of Repair Needed For Item: <Enter description of what is needed to repair item>

Approve    Reject

FIG. 10

Physical Property Management Computing Platform
*Request For Repair Data*

Date of Request: XX-YY-ZZZZ

Item Description: <Enter description of physical property item>

Description of Repair Needed For Item: <Enter description of what is needed to repair item>

Conditions That Must Be Met: <Enter conditions that must be met>

Click To Respond

FIG. 11

BLOCKCHAIN-BASED PROPERTY REPAIR

CROSS-REFERENCE TO RELATED APPLICATIONS

This application is related to U.S. application Ser. No. 15/938,120 entitled "Blockchain-based Property Management", U.S. application Ser. No. 15/938,184 entitled "Blockchain-based Property Management," and U.S. application Ser. No. 15/938,410 entitled "Blockchain-based Property Utilization," which are all being filed concurrently with this application and which are all herein incorporated by reference in their entirety.

FIELD

Aspects described herein generally relate to decentralized peer-to-peer (e.g., P2P) computer systems specialized for the purpose of managing a blockchain. In particular, one or more aspects of the disclosure relate to managing physical property items on or using a blockchain.

BACKGROUND

Aspects of the disclosure relate to electrical computers, digital processing systems, and blockchain-based approaches to manage utilization and repair of physical property items. In particular, one or more aspects of the disclosure relate to enabling multicomputer processing of data from multiple sources for managing utilization and repair of physical property items. Once this data has been processed, aspects of the disclosure further relate to execution of events related to the data.

As computer systems are increasingly utilized to provide automated and electronic services, such computer systems may obtain and maintain increasing amounts of various types of information, and ensuring the safety, security, and accuracy of this information may be increasingly important. In many instances, however, it may be difficult to ensure the safety and security of such information while also optimizing the efficient and effective technical operations of the computer systems that process such information and/or provide such automated and electronic services.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards managing information related to physical property items on a blockchain.

In accordance with one or more aspects, a computing device configured to operate in a decentralized peer-to-peer (P2P) network and including at least one or more processors and memory storing at least a portion of a blockchain of the decentralized P2P network may receive, from a first user computing device associated with a first user, a physical property item registration request for registering a first physical property item. Here, the first physical property item may be associated with a first item type and the physical property item registration request may include historical usage information and registration information for the first physical property item. Then the computing device may register the first physical property item of a plurality of physical property items by adding a first new block to the blockchain. Here, the first new block may include the historical usage information and the registration information for the first physical property item. Next, the computing device may add a second new block to the blockchain based on the registration information and the historical usage information. Here, the second new block may include information to facilitate repair of the first physical property item.

Furthermore, the computing device may analyze the historical usage information for the first physical property item to identify a quality metric of the first physical property item. The computing device may also receive, from a second user computing device associated with a second user, a user registration request associated with the first physical property item. The computing device may further register the second user computing device by adding a third new block to the blockchain. Here, the third new block may include sufficient information to allow the second user computing device to initiate usage of the first physical property item. Moreover, the second user computing device may be one of a plurality of user computing devices that can initiate usage of the first physical property item. Subsequently, the computing device may receive, from the second user computing device, a use request including use information for using a physical property item associated with the first item type. Based on the use information, the computing device may identify the first physical property item for use by the second user. Next, the computing device may allocate the first physical property item for use by the second user.

In additional aspects, the computing device may receive, from the first physical property item, real-time usage information as the first physical property item is used by the second user. Moreover, the computing device may add a fourth new block to the blockchain. Here, the fourth new block may include the real-time usage information from the first physical property item.

In further aspects, the computing device may analyze the real-time usage information to determine that the first physical property item is in need of repair. The computing device may further generate a notification indicating that the first physical property item is in need of repair and requesting authorization to repair the first physical property item. Then the computing device may transmit, to the first user computing device, the notification indicating that the first physical property item is in need of repair and requesting authorization to repair the first physical property item. Next, the computing device may receive, from the first user computing device, authorization to repair the first physical property item.

Moreover, the computing device may generate a request for repair data from a plurality of data processing computing platforms. The computing platform may also transmit the request to the plurality of data processing computing platforms. Subsequently, the computing platform may receive a plurality of responses from the plurality of data processing computing platforms. Based on the information in the second new block and the plurality of responses, the computing platform may identify a first one of the plurality of responses for execution of an event associated with the repair of the first physical property item. Finally, the computing platform may execute the event associated with the repair of the first physical property item.

In some aspects, the request may include the historical usage information and the real-time usage information. In addition, the computing platform may add a fifth new block to the blockchain. Here, the fifth new block may include information related to execution of the event.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 5A-5G depict an illustrative event sequence for execution of events related to property utilization in accordance with one or more example embodiments.

FIG. 6 depicts an example message for registering a physical property item in accordance with one or more example embodiments.

FIG. 7 depicts an example message transmitted from a physical property management computing platform indicating that a physical property item is available for use in accordance with one or more example embodiments.

FIGS. 9A-9L depict an illustrative event sequence for execution of events related to property repair in accordance with one or more example embodiments.

FIG. 10 depicts an example message transmitted from a physical property management computing platform indicating that a physical property item is in need of repair in accordance with one or more example embodiments.

FIG. 11 depicts an example message transmitted from a physical property management computing platform for requesting repair data in accordance with one or more example embodiments.

DETAILED DESCRIPTION

Figure 1:
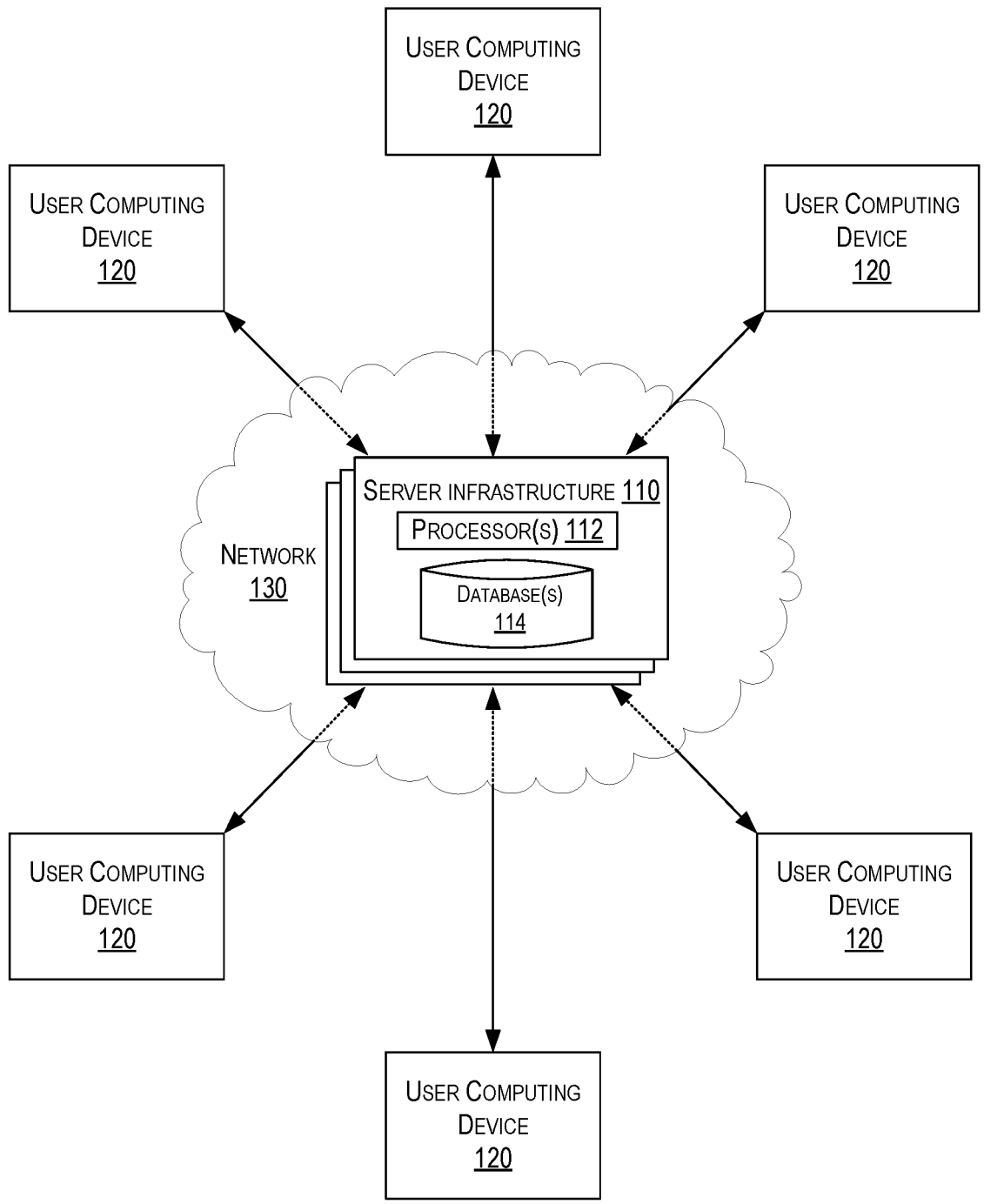
FIG. 1 depicts an illustrative example of a centralized computer system in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

As a general introduction to the subject matter described in more detail below, aspects described herein are directed towards execution of events related to physical property utilization and repair. In some aspects, the scheme described herein employs a decentralized computing system for creating and managing a blockchain.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location such as a business or company. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A user may access the decentralized P2P system through a specialized "wallet" that serves to uniquely identify the user and enable the user to perform functions related to the decentralized P2P network. Through the wallet, the user may be able to hold tokens, funds, or any other asset associated with the decentralized P2P system. Furthermore, the user may be able to use the wallet to request performance of network-specific functions related to the decentralized P2P system such as fund, token, and/or asset transfers. The various computing devices forming the decentralized P2P computing system may operate as a team to perform network-specific functions requested by the user. In performing the network-specific functions, the various computing devices may produce blocks that store the data generated during the performance of the network-specific functions and may add the blocks to the blockchain. After the block has been added to the blockchain, the wallet associated with the user may indicate that the requested network-specific function has been performed.

For example, a user may have a wallet which reflects that the user has five tokens associated with the decentralized P2P system. The user may provide a request to the decentralized P2P system to transfer the five tokens to a friend who also has a wallet. The various computing devices forming the decentralized P2P computing system may perform the request and transfer the five tokens from the wallet of the user to the wallet of the friend. In doing so, a block may be created by the various computing devices of the decentralized P2P computing system. The block may store data indicating that the five tokens were transferred from the wallet of the user to the wallet of the friend. The various computing devices may add the block to the blockchain. At such a point, the wallet of the user may reflect the transfer of the five tokens to the wallet of the friend, and may indicate a balance of zero. The wallet of the friend, however, may also reflect the transfer of the five tokens and may have a balance of five tokens.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality of computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network, aggregated through execution of the one or more digital cryptographic hash functions, and validated by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (e.g., IoT), prediction platforms, election voting, medical records, currency exchange and remittance, P2P transfers, ride sharing, gaming, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "smart contract operations," "balance sheet transactions," and/or user data authentication. A smart contract operation, as used herein, may describe one or more operations performed by a "smart contract," which may be one or more algorithms and/or programs associated with one or more nodes within a decentralized P2P network. A balance sheet transaction may describe one or more changes to data holdings associated with one or more nodes within a decentralized network.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network.

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and exploitation and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

Computing Architectures

FIG. 1 depicts an illustrative example of centralized computer system 100 in accordance with one or more illustrative aspects described herein. Centralized computer system 100 may comprise one or more computing devices including at least server infrastructure 110 and user computing devices 120. Each of user computing devices 120 may be configured to communicate with server infrastructure 110 through network 130. In some arrangements, centralized computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks of the centralized entity and interacting with user computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions of the centralized entity and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate a single centralized ledger for data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, centralized computer system 100 also may include one or more networks, which may interconnect one or more of server infrastructure 110 and one or more user computing devices 120. For example, centralized computer system 100 may include network 130. Network 130 may include one or more sub-networks (e.g., local area networks (LANs), wide area networks (WANs), or the like). Furthermore, centralized computer system 100 may include a local network configured to interconnect each of the computing devices comprising server infrastructure 110.

Furthermore, in some embodiments, centralized computer system 100 may include a plurality of computer systems arranged in an operative networked communication with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the centralized computer system 100 described in regard to FIG. 1, server infrastructure 110 may serve as a central authority which manages at least a portion of the computing data and actions performed in relation to the particular entity associated with server infrastructure 110. As such, server infrastructure 110 of centralized computer system 100 provides a single point of failure which, if compromised by a malicious attacker, can lead to data tampering, unauthorized data disclosure, and exploitation and/or loss of operative control of the processes performed by the server infrastructure 110 in relation to the particular entity associated with server infrastructure 110. In such a centralized construct in which a single point of failure (e.g., server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
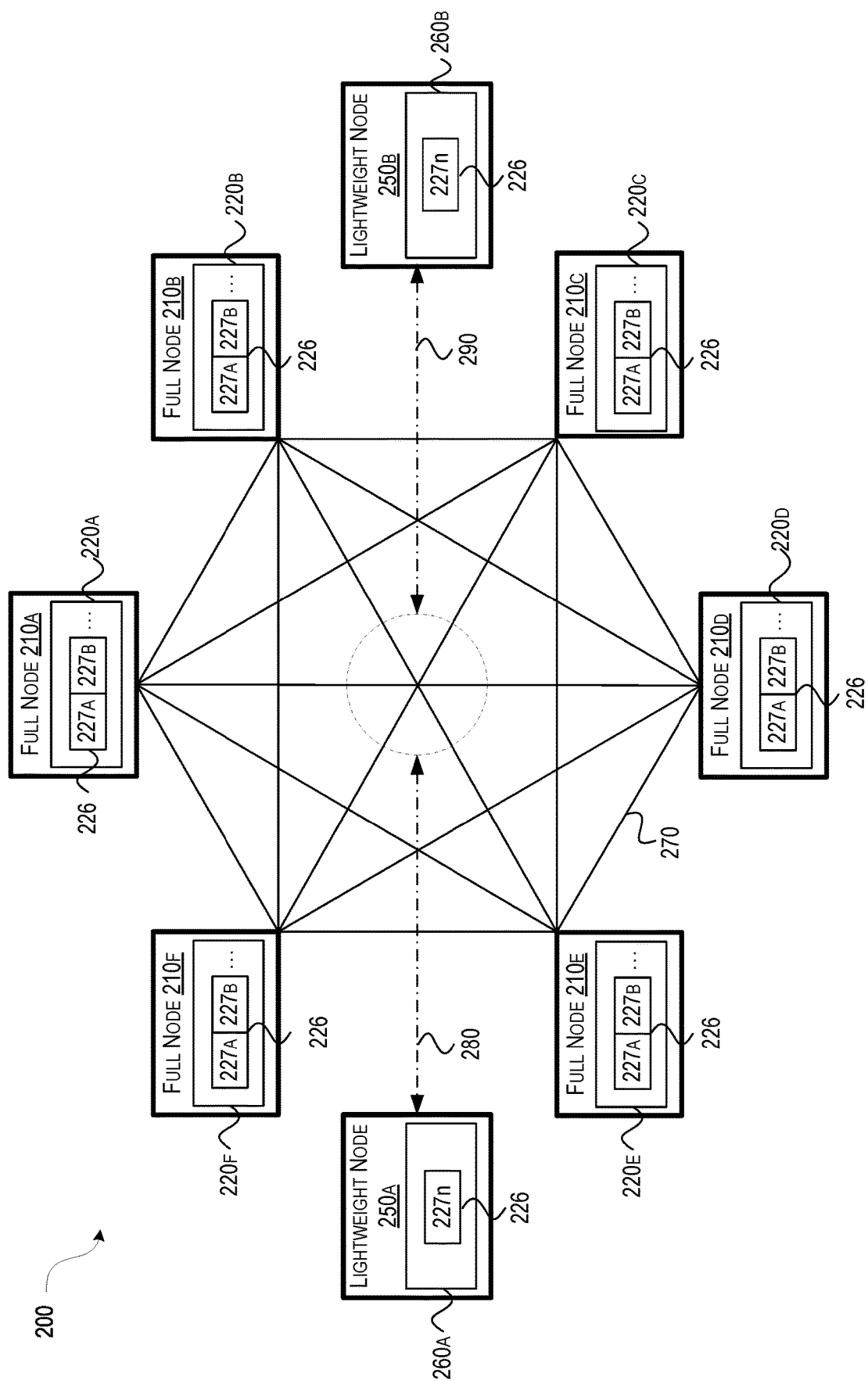
FIG. 2 depicts an illustrative example of a decentralized P2P computer system that may be used in accordance with one or more illustrative aspects described herein.

FIG. 2 depicts an illustrative example of decentralized P2P computer system 200 that may be used in accordance with one or more illustrative aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in regard to FIG. 3A and lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200. Furthermore, the execution of network protocols by the processors, ASIC devices, and/or graphics processing units (e.g., GPUs) of full node computing devices 210A-210F may cause full node computing devices 210A-210F to execute network functions related to blockchain 226 and thereby maintain decentralized P2P network 270.

Lightweight node computing devices 250A and 250B may request execution of network functions related to blockchain 226 in decentralized P2P network 270. In order to request execution of network functions, such as balance sheet transaction and/or smart contract operations, processors of lightweight node computing devices 250A and 250B may execute network commands to broadcast the network functions to decentralized P2P network 270 comprising full node computing devices 210A-210F.

For example, lightweight node computing device 250A may request execution of a balance sheet transaction related to blockchain 226 in decentralized P2P network 270, which may entail a data transfer from a private/public key associated with lightweight node computing device 250A to a private/public key associated with lightweight node 250B. In doing so, processors of lightweight node computing device 250A may execute network commands to broadcast balance sheet transaction network function request 280 to decentralized P2P network 270. Balance sheet transaction network function request 280 may include details about the data transfer such as data type and amount, as well as a data transfer amount to full node computing devices 210A-201F of decentralized P2P network 270 for executing balance sheet transaction network function request 280. Balance sheet transaction network function request 280 may further include the public key associated with lightweight node computing device 250B. Processors of lightweight node computing device 250A may execute digital signature algorithms to digitally sign balance sheet transaction network function request 280 with the private key associated with lightweight node computing device 250A.

At decentralized P2P network 270, balance sheet transaction network function request 280 may be broadcasted to each of full node computing devices 210A-210F through execution of network protocols by full node computing devices 210A-210F. In order to execute balance sheet transaction network function request 280 and maintain internodal agreement as to the state of blockchain 226, processors, ASIC devices, and/or GPUs of full node computing devices 210A-210F may execute network protocols to receive the broadcast of the network function through a decentralized P2P network 270 and from lightweight node computing device 250A. Processors, ASIC devices, and/or GPUs of full node computing devices 210A-210F may execute hash functions to generate a digest of balance sheet transaction network function request 280. The resultant digest of balance sheet transaction network function request 280, in turn, may be hashed with the block hash of the most immediately preceding block of blockchain 226. Processors, ASIC devices, and/or GPUs of full node computing devices 210A-210F may execute consensus algorithms to identify a numerical value (e.g., nonce) corresponding to the particular executed consensus algorithm and related to the digest that combines the digest of the balance sheet transaction network function request 280 and the block hash of the most immediately preceding block of blockchain 226.

For example, in embodiments in which the consensus algorithm is proof of work (e.g., PoW), processors, ASIC devices, and/or GPUs of full node computing devices 210A-210F may perform a plurality of hashing operations to identify a nonce that, when hashed with the digest that combines the digest of the balance sheet transaction network function request 280 and the block hash of the most immediately preceding block of blockchain 226, produces a hash of a predetermined alphanumerical format. Such a predetermined alphanumerical format may include a predetermined number of consecutive alphanumerical characters at a predetermined position within the resultant digest that combines the nonce, digest of the balance sheet transaction network function request 280, and block hash of the most immediately preceding block of blockchain 226.

In embodiments in which the consensus algorithm is proof of stake (e.g., PoS), a private key associated with one of full node computing devices 210A-210F may be pseudo-randomly selected, based on balance sheet holdings associated with the public keys of full node computing devices 210A-210F, to serve as the nonce. For example, through execution of the PoS consensus algorithm, full node computing devices 210A-210F are entered into a lottery in which the odds of winning are proportional to a balance sheet amount associated with the public key of each of full node computing devices 210A-210F, wherein a larger balance sheet amount corresponds to a higher probability to win the lottery. The PoS consensus algorithm may cause a full node computing device from full node computing devices 210A-210F to be selected, and the public key of the selected full node computing device to be used as the nonce.

In embodiments in which the consensus algorithm is delegated proof of stake (e.g., DPoS), a group of delegates are chosen from full node computing devices 210A-210F by each of computing devices 210A-210F, wherein full node computing devices 210A-210F are allowed to vote on delegates based on balance sheet holdings associated with the respective public keys. Full node computing devices 210A-210F, however, may not vote for themselves to be delegates. Once the group of delegates are chosen, the group of delegates from full node computing devices 210A-210F select a public key associated with one of full node computing devices 210A-210F to serve as the nonce. Again, each of the delegates are prohibited from selecting themselves and their respective public key from serving as the nonce.

In embodiments in which the consensus algorithm is practical byzantine fault tolerance algorithm (e.g., PBFT), each of full node computing devices 210A-210F are associated with a particular status and/or ongoing specific information associated with the respective public key of the full node computing devices. Each of full node computing devices 210A-210F receive a message through decentralized P2P network 270 based on network protocols. Based on the received message and particular status and/or ongoing specific information, each of full node computing devices 210A-210F perform computational tasks and transmit a response to the tasks to each of the other full node computing devices 210A-210F. A public key associated with a particular full node computing device from full node computing devices 210A-210F is selected by each of full node computing devices 210A-210F based on the response of the particular full node computing device best fulfilling criteria determined based on the network protocols.

The identification of the nonce enables processors, ASIC devices, and/or GPUs of the full node computing device from full node computing devices 210A-210F to create a new block with a block header (e.g., block hash), which is a digest that combines the digest of balance sheet transaction network function request 280, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 260A for executing balance sheet transaction network function request 280. After the new block has been added to blockchain 226, balance sheet transaction network function request 280 may be considered to be executed and the data transfer from the private/public key associated with lightweight node computing device 250A to the private/public key associated with lightweight node 250B may be registered.

As stated above, in some arrangements, a plurality of network function requests may be broadcasted across decentralized network P2P network 270. Processors, ASIC devices, and/or GPUs of full node computing devices 210A-210F may execute network protocols to receive broadcast of each of the network functions, including balance sheet transaction network function request 280, through decentralized P2P network 270 and from the requesting entities, including lightweight node computing device 250A. Processors, ASIC devices, and/or GPUs of full node computing devices 210A-210F may execute hash functions to generate a hash tree (e.g., Merkle tree) of the requested network functions, which culminates in a single digest (e.g., root digest, root hash, and the like) that comprises the digests of each of the requested network functions, including balance sheet transaction network function request 280. The root digest of the requested network function, in turn, may be hashed with the block hash of the most immediately preceding block of blockchain 226. Processors, ASIC devices, and/or GPUs of full node computing devices 210A-210B may execute consensus algorithms in the manner described above to identify a nonce corresponding to the particular executed consensus algorithm and related to the digest that combines the root digest of the requested network functions and the block hash of the most immediately preceding block of blockchain 226. The identification of the nonce enables processors, ASIC devices, and/or GPUs of the full node computing device from full node computing devices 210A-210F to create a new block with a block header (e.g., block hash), which is a digest that combines the root digest of the network function requests, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by each of the network function requests. After the new block has been added to blockchain 226, each of the network functions requests, including balance sheet transaction network function request 280, may be considered to be executed and the data transfer from the private/public key associated with lightweight node computing device 250A to the private/public key associated with lightweight node 250B may be registered.

While the description provided above is made in relation to a balance sheet transaction involving lightweight node computing device 250A and lightweight node computing device 250B, it is to be understood that balance sheet transactions are not limited to lightweight node computing device 250A and lightweight node computing device 250B, but rather may be made across any of the full node computing devices and/or lightweight node computing devices in decentralized P2P system 200.

For another example, lightweight node computing device 250B may request a smart contract operation related to blockchain 226 in decentralized P2P network 270, which may facilitate a dual data transfer between a private/public key associated with lightweight node computing device 250B and a private/public key associated lightweight node computing device 250A. Processors of lightweight node computing device 250B may execute network commands to broadcast smart contract operation network function request 290 to decentralized P2P network 270. Smart contract operation network function request 290 may include details about the data transfer such as data type and amount, as well as a data transfer amount to full node computing devices 210A-210F of decentralized P2P network 270 for executing smart contract operation network function request 290. Smart contract operation network function request 290 may further include the public key associated with the smart contract. Processors of lightweight node computing device 250B may execute digital signature algorithms to digitally sign smart contract operation network function request 290 with the private key associated with lightweight node computing device 250B.

At decentralized P2P network 270, smart contract operation network function request 290 may be broadcasted to each of full node computing devices 210A-210F through execution of network protocols by full node computing devices 210A-210F. In order to execute smart contract operation network function request 290 and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250B. Processors, ASIC devices, and/or GPUs of full node computing devices 210A-210F may execute hash functions to generate a digest of smart contract operation network function request 290. The resultant digest of smart contract operation network function request 290, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of smart contract operation network function request 290 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines smart contract operation network function request 290, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may, per the network protocols, increase a balance sheet holdings amount associated with itself by a predetermined amount. In some arrangements, each of full node computing devices 210A-210F may receive an equal portion of the data transfer amount specified by lightweight node computing device 260A for executing smart contract operation network function request 290. After the new block has been added to blockchain 226, smart contract operation request 290 may be considered to be executed and the data transfer from the private/public key associated with lightweight node computing device 250B to the private/public key associated with the smart contract may be registered.

The smart contract may be configured to hold the data transfer from the private/public key associated with lightweight node computing device 250B until fulfillment of certain predetermined criteria hardcoded into the smart contract is achieved. The smart contract may be configured such that it serves as an intermediate arbiter between entities within the decentralized P2P network 270 and may specify details of a dual data transfer between entities.

Lightweight node computing device 250A may also request a smart contract operation related to blockchain 226 in decentralized P2P network 270, which may conclude the dual data transfer between a private/public key associated lightweight node computing device 250A and a private/public key associated with lightweight node computing device 250B. Processors of lightweight node computing device 250A may execute network commands to broadcast the smart contract operation network function request to decentralized P2P network 270. The smart contract operation network function request may include details about the data transfer such as data type and amount, as well as a data transfer amount to full node computing devices 210A-210F of decentralized P2P network 270 for executing the smart contract operation network function request. The smart contract operation network function request may further include the public key associated with the smart contract. Processors of lightweight node computing device 250A may execute digital signature algorithms to digitally sign the smart contract operation network function request with the private key associated with lightweight node computing device 250A.

At decentralized P2P network 270, the smart contract operation network function request may be broadcasted to each of full node computing devices 210A-210F through execution of network protocols by full node computing devices 210A-210F. In order to execute the smart contract operation network function request and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of the smart contract operation network function request. The resultant digest of the smart contract operation network function request, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of the smart contract operation network function request and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 260A for executing the smart contract operation network function request. After the new block has been added to blockchain 226, the smart contract operation transaction network function request 290 may be considered to be executed and the data transfer from the private/public key associated with lightweight node computing device 250A to the private/public key associated with the smart contract may be registered.

When the smart contract receives the data value from each of lightweight node computing device 250A and lightweight node computing device 250B, the smart contract may transfer the data value from lightweight node computing device 250A to lightweight node computing device 250B and the data value from lightweight node computing device 250B to lightweight node computing device 250A.

While the description provided above was made in relation to lightweight node computing device 250A and lightweight node computing device 250B, it should be understood that any of the full node computing devices and lightweight node computing devices in decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer.

In comparison to the centralized computing system 100 described in regard to FIG. 1, decentralized P2P computer system 200 may provide technological advantages. For example, by distributing storage of blockchain 226 across multiple full node computing devices 210A-210F, decentralized P2P computer system 200 may not provide a single point of failure for malicious attack. In the event that any of the full node computing devices 210A-210F are compromised by a malicious attacker, decentralized P2P computer system 200 may continue to operate unabated as data storage of blockchain 226 and network processes are not controlled by a singular entity such as server infrastructure 110 of centralized computing system 100.

Furthermore, by utilizing blockchain data structure 226, decentralized P2P system 200 may provide technological improvements to conventional decentralized P2P systems in regard to byzantine fault tolerance stemming from an unreliable and/or malicious full node acting in decentralized P2P network 270 to undermine the work efforts of the other nodes. For example, in coordinating action between full node computing devices 210A-210F in relation to a similar computational task (e.g., consensus algorithm), a malicious node would need to have computational power greater than the combined computational power of each of the other full node computing devices in decentralized P2P network 270 to identify the nonce and thereby be able to modify blockchain 226. As such, the likelihood that a malicious node could subvert decentralized P2P network 270 and enter falsified data into blockchain 270 is inversely proportional to the total computational power of decentralized P2P system 200. Therefore, the greater the total computational power of decentralized P2P system 200, the less likely that a malicious node could subvert decentralized P2P network 270 and undermine blockchain 226.

Figure 3:
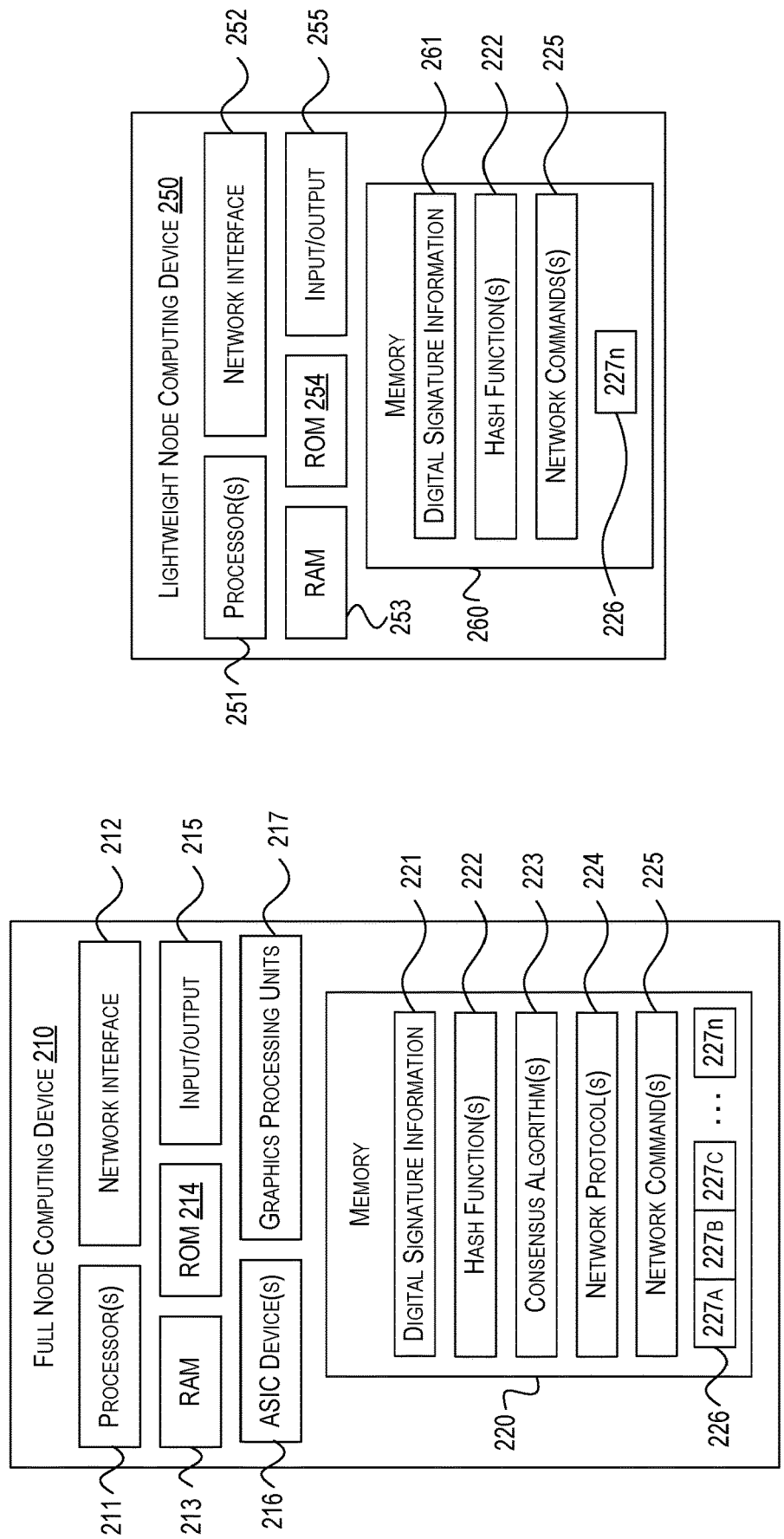
FIG. 3A depicts an illustrative example of a full node computing device that may be used in accordance with one or more illustrative aspects described herein.
FIG. 3B depicts an illustrative example of a lightweight node computing device that may be used in accordance with one or more illustrative aspects described herein.

FIG. 3A depicts an illustrative example of a full node computing device 210 that may be used in accordance with one or more illustrative aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and may request execution of network functions and/or to execute requested network functions and maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary, support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

For example, in order to create and maintain a decentralized P2P network, processors 211, ASIC devices 216, and/or GPUs 217 of full node computing device 210 may execute network protocols 225. Execution of network protocols 225 may cause full node computing device 210 to form a communicative arrangement with other full node computing devices and thereby create a decentralized P2P network. Furthermore, the execution of network protocols 225 may cause full node computing device 210 to maintain the decentralized P2P network through the performance of computational tasks related to the execution of network requests related to a blockchain such as blockchain 226. As will be described in detail below, the execution of such computational tasks (e.g., hash functions 222, consensus algorithms 223, and the like) may cause full node computing device 210 to maintain inter-nodal agreement as to the state of a blockchain with other full node computing devices comprising the decentralized P2P network.

In order to request execution of network functions, such as balance sheet transactions and/or smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221.

In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node. Processors 211, ASIC devices 216, and/or GPUs 217 of full node computing device 210 may execute hash functions 222 to generate a digest of the requested network function. The resultant digest of the requested network function, in turn, may be hashed with the block hash of the most immediately preceding block of the blockchain. As will be described in further detail below, processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the digest of the requested network function, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

As stated above, in some arrangements, a plurality of network function requests may be broadcasted across the decentralized network P2P network. Processors 211, ASIC devices 216, and/or GPUs 217 of full node computing device 210 may execute network protocols 224 to receive broadcast of each of the network functions through the decentralized P2P network and from the requesting entities. Processors 211, ASIC devices 216, and/or GPUs 217 of full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. Processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the root digest of the requested network functions, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

Furthermore, memory 220 of full node computing device 210 may store blockchain 226. Blockchain 226 may include a blocks 227A, 227B, 227C, ... 227n, wherein block 227A represents the first block (e.g., genesis block) of blockchain 226 and block 227n represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

FIG. 3B depicts an illustrative example of a lightweight node computing device 250 that may be used in accordance with one or more illustrative aspects described herein. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, lightweight node computing device 250 may operate in a decentralized P2P network and may be configured to request execution of network functions through the decentralized P2P network. As such, lightweight node computing device 250 may be different from full node computing device 210 in that it is not configured to execute network functions and/or operate to maintain a blockchain of a decentralized P2P network. In other aspects, lightweight node computing device 250 may have substantially the same physical configuration as full node computing device 210, but configured with different programs, software.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing secondary, support, and/or other functionality which may or might not be used in conjunction with aspects described herein.

In comparison to full node computing device 210, lightweight node computing device 250 might not include, in some instances, specialized hardware such as ASIC devices 216 and/or GPUs 217. Such is the case because lightweight node computing device 250 might not be configured to execute network functions and/or operate to maintain a blockchain of a decentralized P2P network as is full node computing device 210. However, in certain arrangements, lightweight node computing device 250 may include such specialized hardware.

Memory 260 of lightweight node computing device 250 may also store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210.

In regard to the digital signature information, each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different from that of the private/public key information of digital signature information 221 stored in memory 220 of full node computing device 210. Furthermore, the private/public key information of each node, whether full or lightweight, in a decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in a decentralized P2P computing network.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as balance sheet transactions and/or smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Furthermore, memory 260 of lightweight node computing device 250 may store blockchain 226. Blockchain 226 stored in memory 260 of lightweight node computing device 250 may include at least block 227n, wherein block 227n represents the most immediate block of blockchain 226. As such, the blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

Event Execution Related to Property Utilization and Repair

Figure 4:
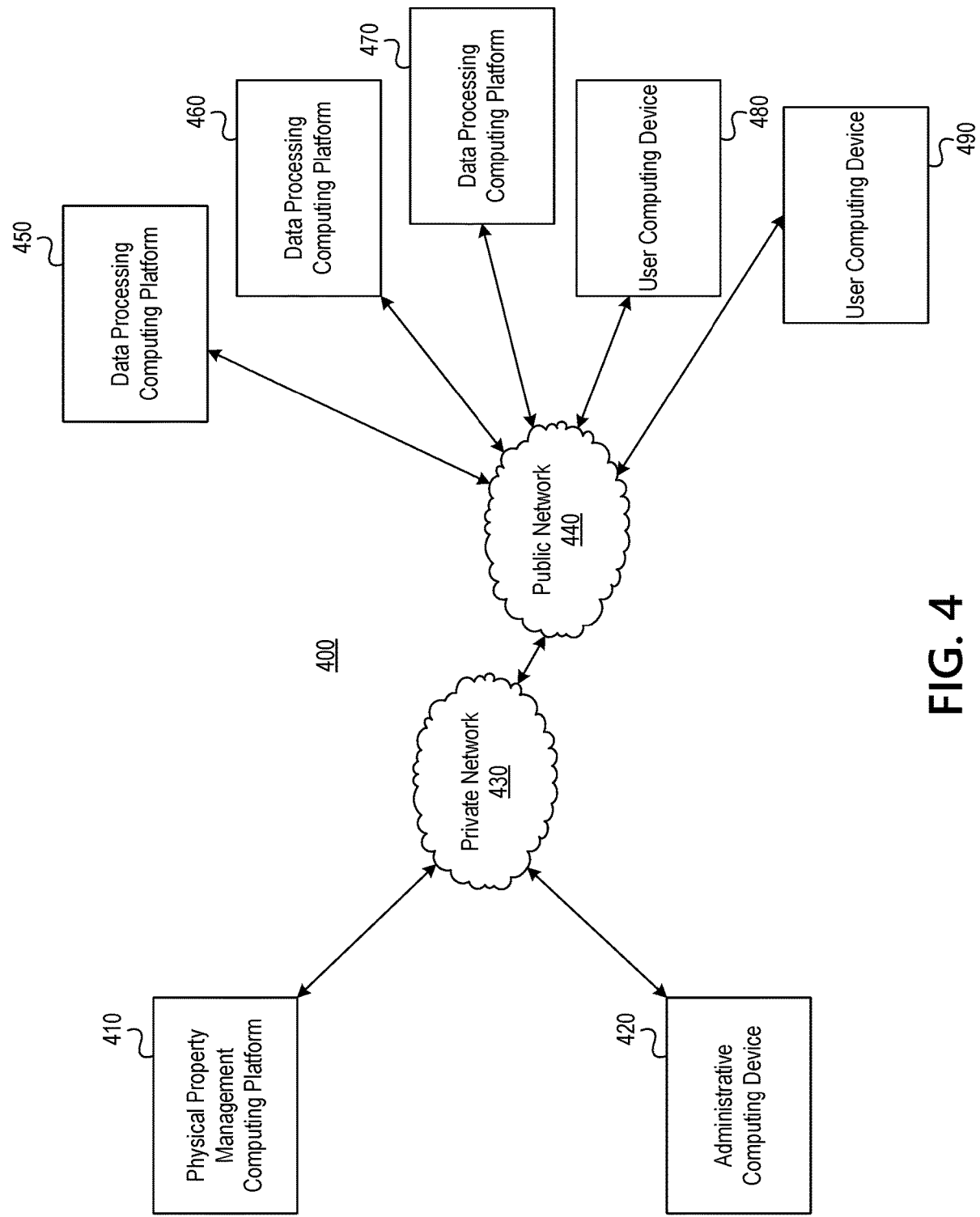
FIG. 4 depicts an illustrative computing environment for execution of events related to property utilization and repair in accordance with one or more example embodiments.

FIG. 4 depicts an illustrative computing environment for execution of events related to property utilization and repair in accordance with one or more example embodiments. Referring to FIG. 4, computing environment 400 may include one or more computer systems, one or more computer networks, and/or other computing infrastructure. For example, computing environment 400 may include a physical property management computing platform 410, an administrative computing device 420, a private network 430, a public network 440, data processing computing platforms 450-470, and user computing devices 480-490.

In addition to performing specific functions detailed further below, each of physical property management computing platform 410, administrative computing device 420, data processing computing platforms 450-470, and user computing devices 480-490 may function as full node computing devices 210 or as lightweight node computing devices 250 to register various types of physical property items by adding them onto a blockchain, maintain a copy of the current state of the blockchain, execute events related to the utilization and repair of the physical property items, and communicate with other network nodes functioning as lightweight node computing devices 250. In one embodiment, physical property management computing platform may function as a full node computing device 210 and data processing computing platforms 450-470 and user computing devices 480-490 may function as lightweight node computing devices 250.

In other embodiments, more than one platform in computing environment 400 may function as a full node computing device 210. For example, physical property management computing platform 410, data processing computing platforms 450-470, and user computing devices 480-490 may all function as full node computing devices 210 in computing environment 400. In this example, physical property management computing platform 410, data processing computing platforms 450-470, and user computing devices 480-490 may all operate to create and maintain a decentralized network, execute requested network functions related to event execution for property utilization and repair, and maintain inter-nodal agreement as to the state of a blockchain for property utilization and repair. In order to perform these functions, physical property management computing platform 410, data processing computing platforms 450-470, and user computing devices 480-490 may all have a complete replica or copy of the blockchain stored in memory, as well as executable instructions for the execution of hash functions, consensus algorithms, digital signature information, network protocols, and network commands. In this example, physical property management computing platform 410, data processing computing platforms 450-470, and user computing devices 480-490 may store and process blockchain-based data related to physical property utilization and repair.

When functioning as a lightweight node 250, data processing computing platforms 450-470 and user computing devices 480-490 may request performance of network functions (e.g., to process data related to property utilization and repair, to have smart contract operations executed after processing the data, and the like). However, when functioning as a lightweight node 250, data processing computing platforms 450-470 and user computing devices 480-490 may not have the capacity to execute the network functions and maintain inter-nodal agreement as to the state of a blockchain for any given physical property item.

As discussed in greater detail below, physical property management computing platform 410 may include one or more computing devices configured to perform one or more of the functions described herein. For example, physical property management computing platform 410 may include one or more computers (e.g., laptop computers, desktop computers, servers, server blades, or the like) that are configured to orchestrate event execution operations related to physical property utilization and repair across multiple computer systems and devices in computing environment 400.

Administrative computing device 420 may be a desktop computer, laptop computer, workstation, or other computing device that is configured to be used by an administrative user, such as a network administrator associated with an organization operating physical property management computing platform 410.

Data processing computing platforms 450-470 may include one or more computing devices configured to process data received from one or more devices in environment 400, including data received from physical property management computing platform 410. Each of platforms 450-470 may be provided by an organization different from the organization operating physical property management computing platform 410. In some instances, data processing computing platforms 450-470 may process messages from platform 410 and respond to those messages with repair data. In one example, platform 410 may transmit a message requesting a cost estimate for repairing damage to a physical property item or replacing a physical property item to one or more of platforms 450-470. Platforms 450-470 may respond to these messages with repair data including the requested cost estimates.

User computing devices 480-490 may be a desktop computer, laptop computer, workstation, mobile device, or other computing device that are configured to be used by a user to communicate in environment 400. For example, user computing devices 480-490 may transmit a physical property item registration request or a user registration request to physical property management computing platform 410.

Computing environment 400 also may include one or more networks, which may interconnect one or more of physical property management computing platform 410, administrative computing device 420, data processing computing platforms 450-470, and user computing devices 480-490. For example, computing environment 400 may include private network 430, which may be owned and/or operated by a specific organization and/or which may interconnect one or more systems and/or other devices associated with the specific organization. For example, data authentication and event execution computing platform 410 and administrative computing device 420 may be owned and/or operated by a specific organization, such as a financial institution, and private network 430 may interconnect physical property management computing platform 410, administrative computing device 420, and one or more other systems and/or devices associated with the organization. Additionally, private network 430 may connect (e.g., via one or more firewalls) to one or more external networks not associated with the organization, such as public network 440. Public network 440 may, for instance, include the internet and may connect various systems and/or devices not associated with the organization operating private network 430. For example, public network 440 may interconnect data processing computing platforms 450-470, user computing devices 480-490, and/or various other systems and/or devices.

In some arrangements, the computing devices that make up and/or are included in physical property management computing platform 410, administrative computing device 420, data processing computing platforms 450-470, and user computing devices 480-490 may be any type of computing device capable of receiving a user interface, receiving input via the user interface, and communicating the received input to one or more other computing devices. For example, the computing devices that make up and/or are included in physical property management computing platform 410, administrative computing device 420, data processing computing platforms 450-470, and/or user computing devices 480-490 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the computing devices that make up and/or are included in physical property management computing platform 410, administrative computing device 420, data processing computing platforms 450-470, and user computing devices 480-490 may, in some instances, be special-purpose computing devices configured to perform specific functions.

Figure 5A:
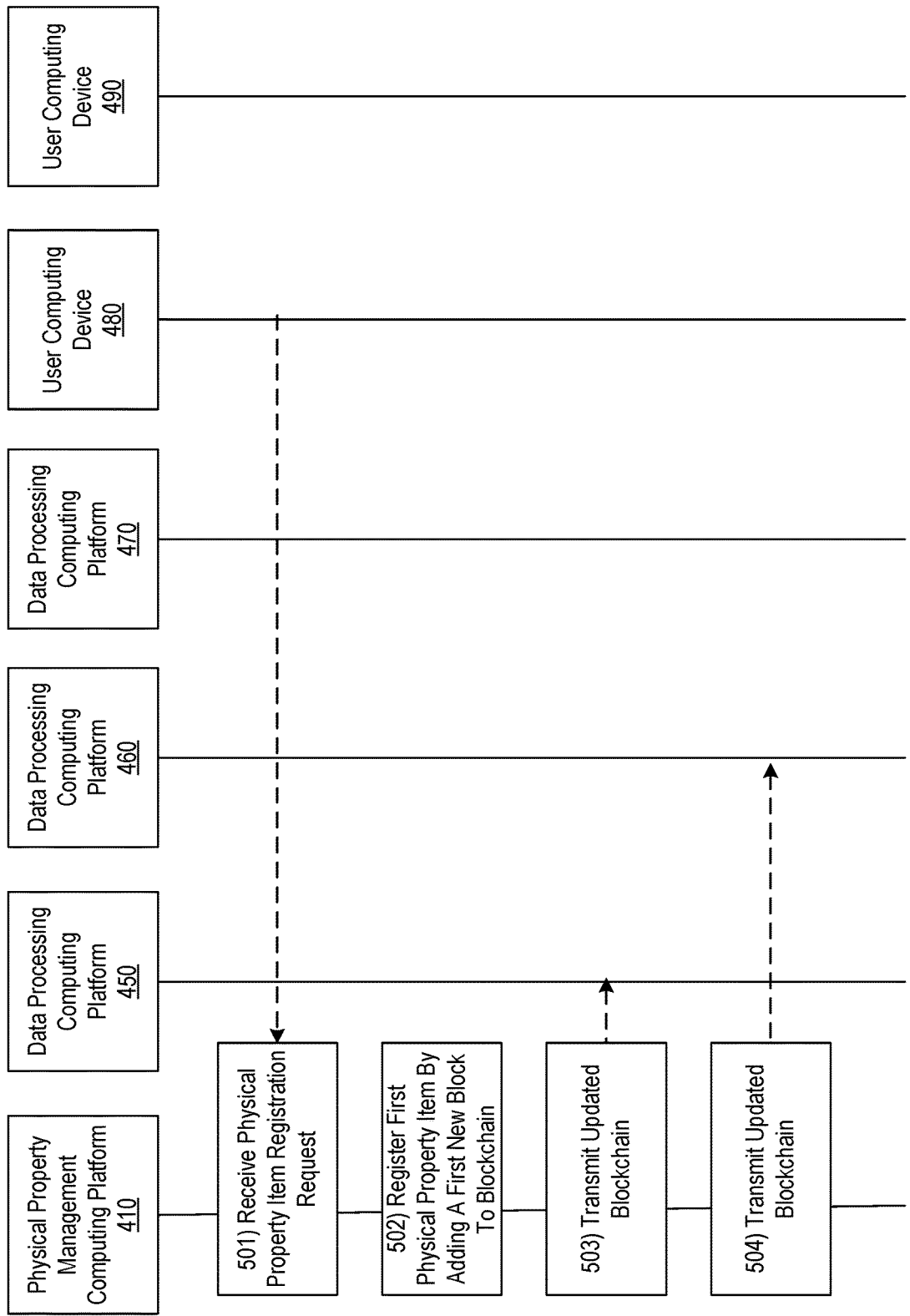

FIGS. 5A-5G depict an illustrative event sequence for execution of events related to property utilization in accordance with one or more example embodiments. Referring to FIG. 5A, at step 501, physical property management computing platform 410 may receive, via a network or communication interface (e.g., network interface 212), a physical property item registration request for registering a first physical property item from user computing device 480 associated with a first user. In general, platform 410 may receive a physical property item registration request from any computing device or platform operating in environment 400. The physical property item may be any type of physical property, including vehicles, real estate, furniture, and computing resources, among other things. The physical property item registration request may include information related to how the physical property item has been used in the past (i.e., historical usage information). The registration request may also include other registration information, including information related to a unique identifier (e.g., model number, serial number, and the like) associated with the physical property item and a description of the physical property item. Once the physical property item registration request is received, platform 410 may verify the authenticity of the information. For example, platform 410 may query a user of user computing device 480 to make sure that the user actually owns the physical property item for which the registration request has been made. Platform 410 may further verify that the unique identifier provided by user computing device 480 corresponds to the item specified by the description. FIG. 6 depicts an example request for registering a physical property item in accordance with one or more example embodiments. As shown in FIG. 6, the request 600 may include the date that the registration request was sent to platform 410, the physical property item registration information, a description of the physical property item, and historical usage information. The request may also allow platform 410 to approve or reject the registration request (based on, for example, whether the information in request 600 has been property verified).

Once the information has been verified, platform 410 may, in step 502, register the first physical property item by adding a first new block to a blockchain associated with the first physical property item. The first new block may include the historical usage information and the registration information for the first physical property item. This blockchain may be maintained by the decentralized peer-to-peer (P2P) network including platform 410 and other devices or computing platforms, as discussed below. Also, in one example, physical property management computing platform 410 may be operated by a financial institution such as a bank.

Figure 5B:
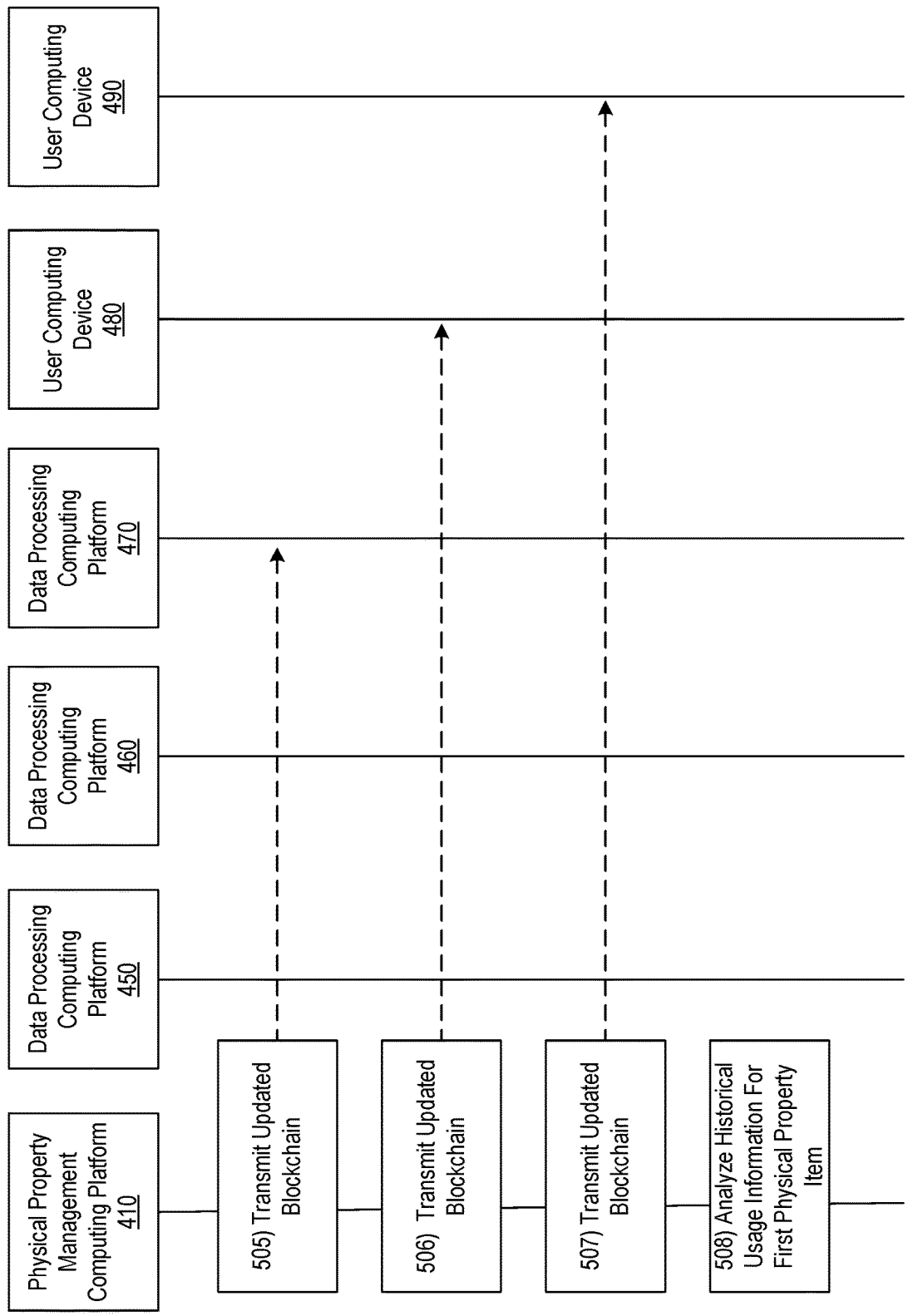

Then, referring to FIGS. 5A-5B, in steps 503-507, platform 410 may transmit the updated blockchain to data processing computing platforms 450-470 and user computing devices 480-490 (assuming all of these devices are operating as full node computing devices 210 in environment 400).

Figure 5C:
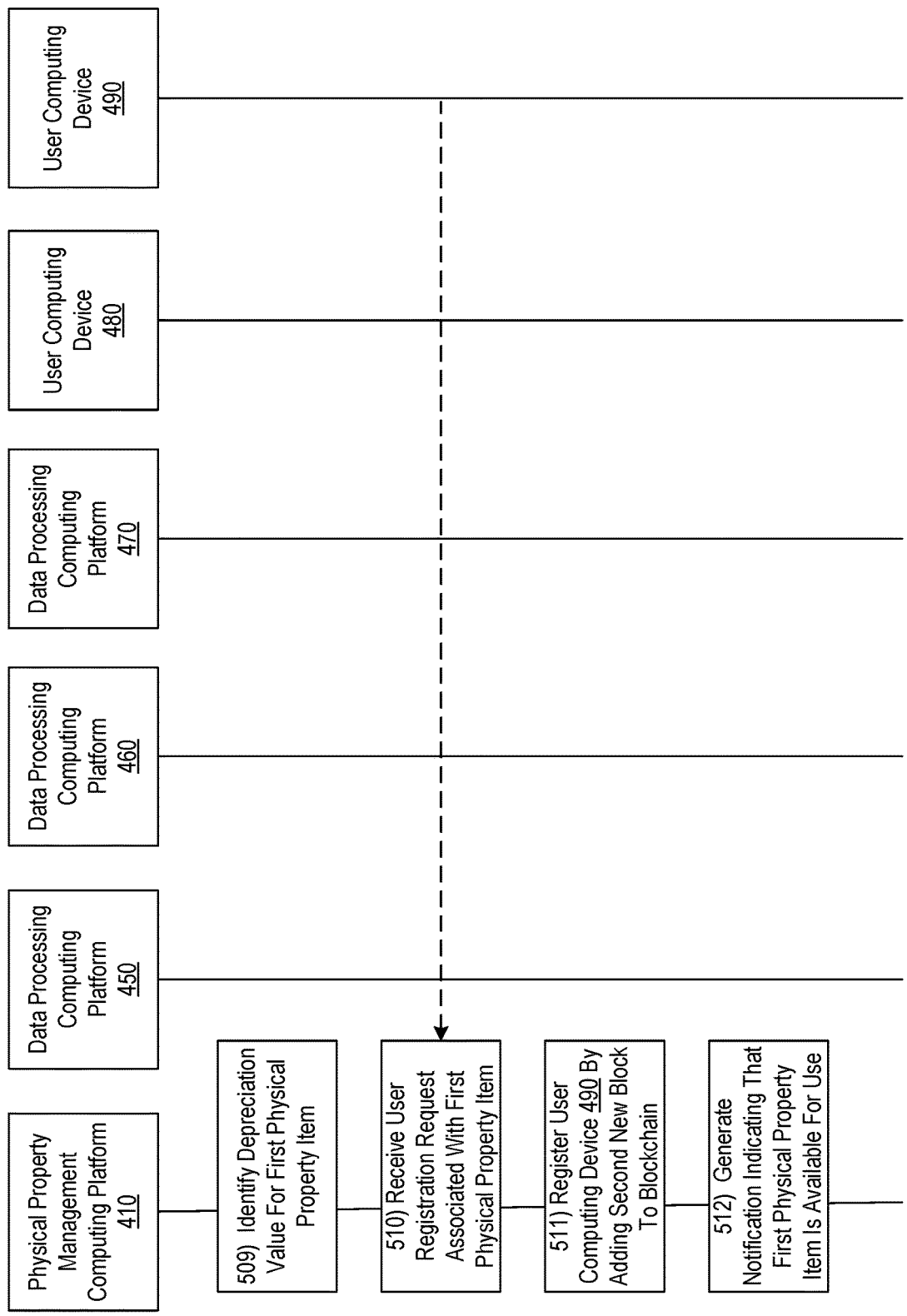

Platform 410 may then analyze, in step 508, the historical usage information for the first physical property item to identify a quality metric of the first physical property item. In some aspects, the quality metric may relate to a physical condition of the first physical property item. For example, if the physical property item has experienced wear or tear (e.g., scratches dents, defects, and the like), platform 410 may identify the location of this damage and may use that information in assessing the physical condition of the first physical property item. Referring to FIG. 5C, platform 410 may then identify, in step 509, a depreciation value for the first physical property item. The depreciation value may take into account the physical condition of the first physical property item.

Then, in step 510, platform 410 may receive, from user computing device 490 associated with a second user, a user registration request for the first physical property item. In the user registration request, the second user may indicate that he wants the ability to initiate usage of the first physical property item upon request. Upon receiving the user registration request, platform 410 may verify that user computing device 490 is associated with a user that actually sent the request (e.g., by calling the user on a telephone number associated with user computing device 490). Once user computing device 490 has been authenticated, the process may move to step 511 where platform 410 may register user computing device 490 by adding a second new block to the blockchain associated with the first physical property item. The second new block may include information identifying the user computing device 490 as a device that should be given the ability to initiate usage of the first physical property item upon request. The blockchain associated with the first physical property item may indicate other devices and computing platforms that have the ability to initiate usage of the first physical property item.

After adding the second new block to the blockchain and determining that the first physical property item is available for use, the process may then move to step 512 where platform 410 may generate a notification indicating that the first physical property item is available for use. Referring to FIGS. 5D-5E, the process may move to steps 513-517 where platform 410 may transmit the notification with a copy of the updated blockchain to data processing computing platforms 450-470 and user computing devices 480-490. In other embodiments, platform 410 may not generate and transmit this notification but rather may merely transmit a copy of the updated blockchain to platforms 450-470 and devices 480-490. FIG. 7 depicts an example message transmitted from a physical property management computing platform indicating that a physical property item is available for use in accordance with one or more example embodiments. As shown in FIG. 7, message 700 may include a date that the notification was sent, the physical property item registration information for the physical property item in question, a description of the physical property item, and a message indicating that the identified item is available for use and providing instructions for submitting a use request for using the identified item.

Then, in step 518, platform 410 may receive, from user computing device 490 associated with the second user, a use request including use information for using a physical property item associated with a first item type. The use information may include a proposed use for the first physical property item. The use request may further include a date that the use is requested and how long the user will need to use the item. For example, the user may request a vehicle for driving from Chicago to San Francisco within a one week period. The user may further specify that he needs a newer vehicle because he wants to minimize the risk of any problems with the vehicle during the trip.

Once the use request is received in step 518, platform 410 may then, in step 519, identify the first physical property item for use by the second user. In general, platform 410 may identify any available physical property item based on the information in the use request. For example, if the user requests a high quality vehicle, then platform 410 may determine that a vehicle manufactured two years ago with limited miles is appropriate for the intended use. As another example, if the user requests a network printer for a low quality print job, then platform 410 may identify a network printer that is suitable for this type of job.

Next, in step 520, platform 410 may allocate the first physical property item for use by the second user (assuming that the first physical property item has been identified by platform 410 for use by the second user). Allocation of the first physical property item to a given user may allow the user to use the first physical property item. For example, platform 410 may determine that a network printer should be allocated to the second user for a predetermined period of time. As another example, platform 410 may deliver a requested vehicle to the second user or provide a pickup location for a requested vehicle.

Figure 5F:
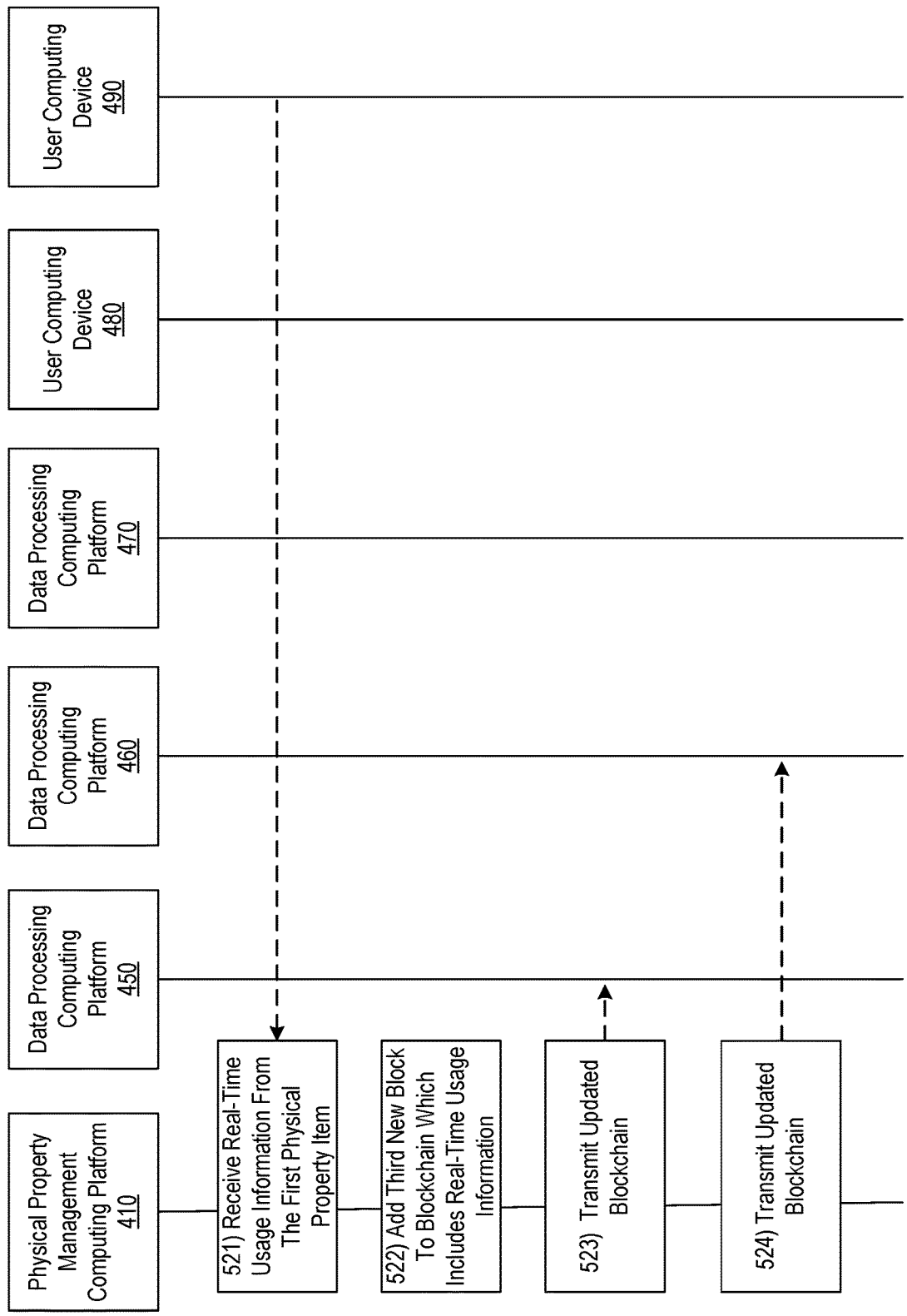
Figure 5G:
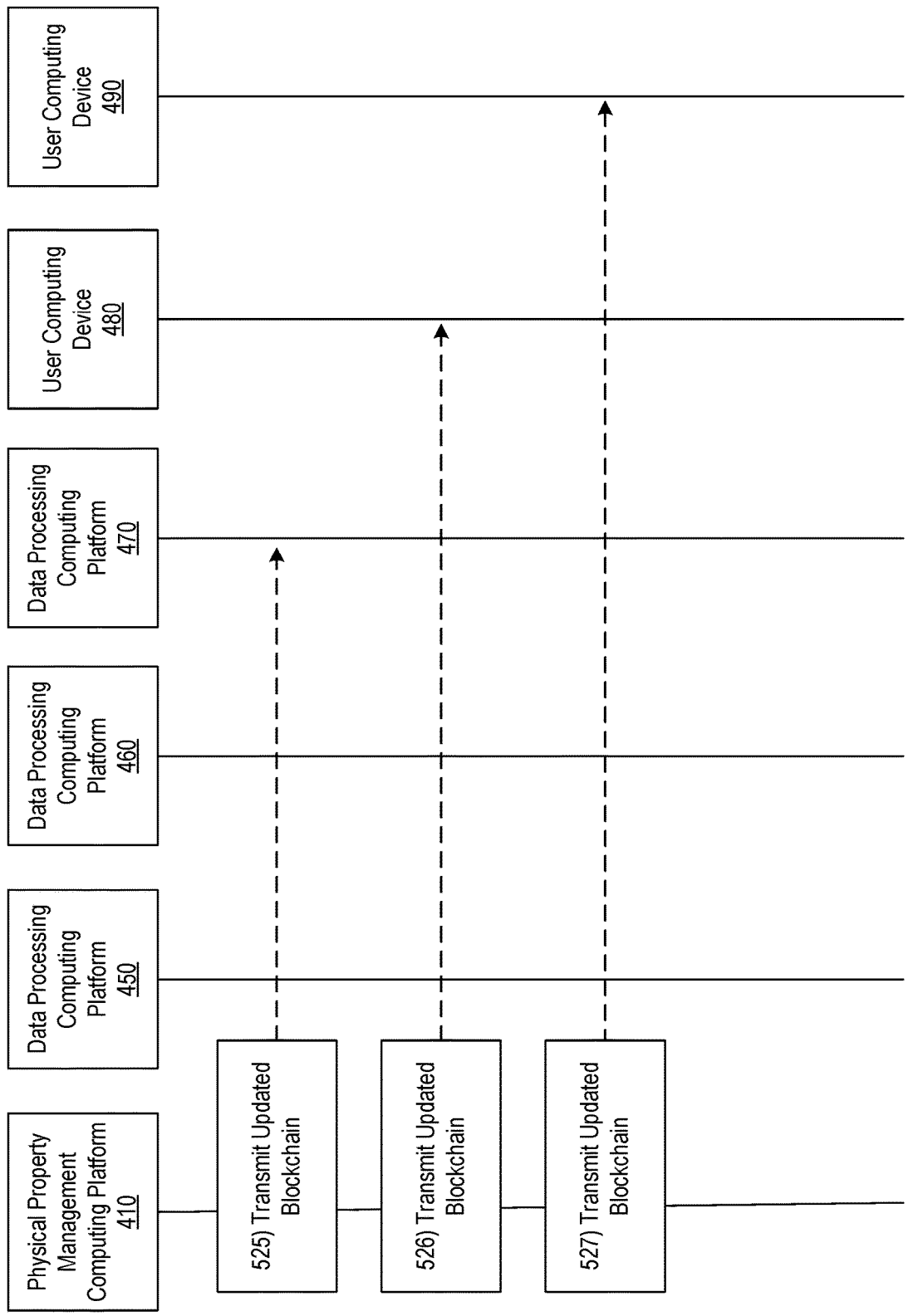

Referring to FIG. 5F, the process may then move to step 521 where platform 410 may receive real-time usage information from the first physical property item as the first physical property item is used by the second user. Here, the first physical property item may have a communications sensor that can directly transmit the real-time usage information to platform 410. In other examples, the first physical property item may first transmit the real-time usage information to user computing device 490 before user computing device 490 transmits the real-time usage information to platform 410. For example, if the first physical property item corresponds to a vehicle, platform 410 may receive information about how the vehicle is being driven by the second user. Alternatively, if the first physical property item corresponds to a network printer, then platform 410 may receive information about the toner level or about how many pages have been printed as the printer is being used. After the real-time usage information has been received by platform 410, platform 410 may add, in step 522, a third new block to the blockchain associated with the first physical property item. The third new block may include the real-time usage information for the first physical property item. Then, referring to FIGS. 5F-5G, in steps 523-527, platform 410 may transmit the updated blockchain to platforms 450-470 and user computing devices 480-490.

Figure 8:
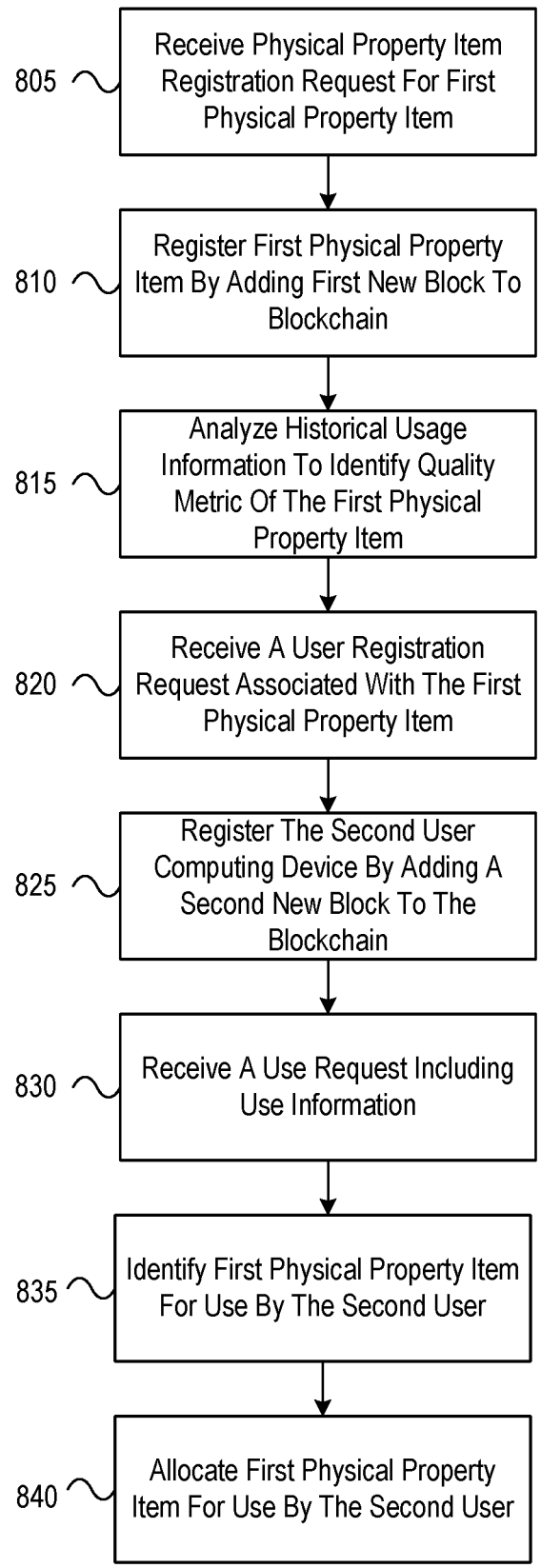
FIG. 8 depicts an illustrative method for execution of events related to property utilization in accordance with one or more example embodiments.

FIG. 8 depicts an illustrative method for execution of events related to property utilization in accordance with one or more example embodiments. Referring to FIG. 8, at step 805, a computing device configured to operate in a decentralized peer-to-peer (P2P) network and including at least one or more processors and memory storing at least a portion of a blockchain of the decentralized P2P network may receive, from a first user computing device associated with a first user, a physical property item registration request for registering a first physical property item. Here, the first physical property item may be associated with a first item type and the physical property item registration request may include historical usage information and registration information for the first physical property item. Subsequently, at step 810, the computing device may register the first physical property item of a plurality of physical property items by adding a first new block to the blockchain. Here, the first new block may include the historical usage information and the registration information for the first physical property item. Then, at step 815, the computing device may analyze the historical usage information for the first physical property item to identify a quality metric of the first physical property item.

At step 820, the computing device may receive, from a second user computing device associated with a second user, a user registration request associated with the first physical property item. Next, in step 825, the computing device may register the second user computing device by adding a second new block to the blockchain. Here, the second new block may include sufficient information to allow the second user computing device to initiate usage of the first physical property item. In addition, the second user computing device may be one of a plurality of user computing devices that can initiate usage of the first physical property item. Then, in step 830, the computing device may receive, from the second user computing device, a use request including use information for using a physical property item associated with the first item type. Subsequently, in step 835, the computing device may identify the first physical property item for use by the second user based on the use information. Finally, in step 840, the computing device may allocate the first physical property item for use by the second user.

Figure 9A:
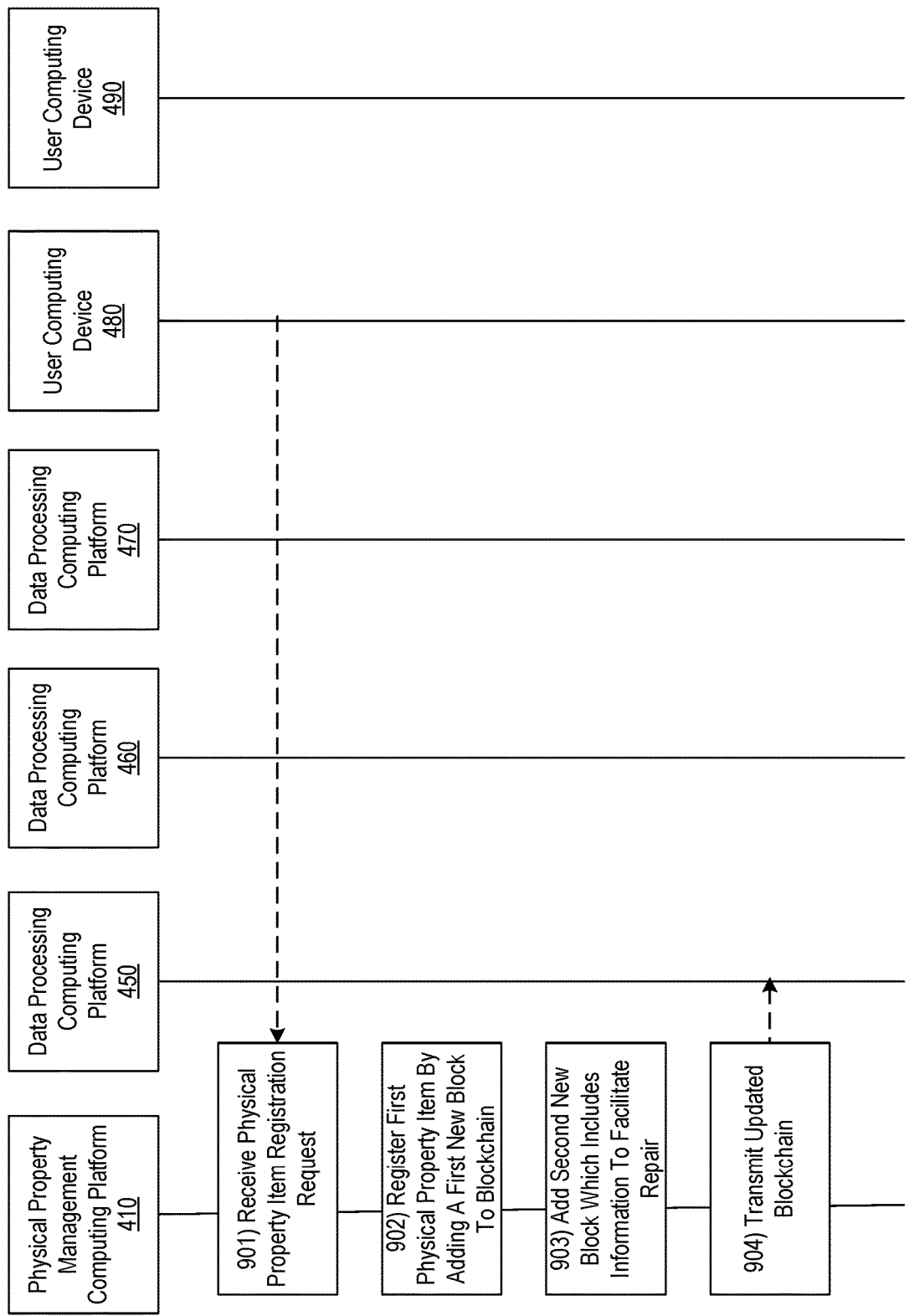

FIGS. 9A-9L depict an illustrative event sequence for execution of events related to property repair in accordance with one or more example embodiments. Referring to FIG. 9A, at step 901, physical property management computing platform 410 may receive, via a network or communication interface (e.g., network interface 212), a physical property item registration request for registering a first physical property item from user computing device 480 associated with a first user. In general, platform 410 may receive a physical property item registration request from any computing device or platform operating in environment 400. The physical property item may be any type of physical property, including vehicles, real estate, furniture, and computing resources, among other things. The physical property item registration request may include information related to how the physical property item has been used in the past (i.e., historical usage information). The registration request may also include other registration information, including information related to a unique identifier (e.g., model number, serial number, and the like) associated with the physical property item and a description of the physical property item. Once the physical property item registration request is received, platform 410 may verify the authenticity of the information. For example, platform 410 may query a user of user computing device 480 to make sure that the user actually owns the physical property item for which the registration request has been made. Platform 410 may further verify that the unique identifier provided by user computing device 480 corresponds to the item specified by the description.

Once the information has been verified, platform 410 may, in step 902, register the first physical property item by adding a first new block to a blockchain associated with the first physical property item. The first new block may include the historical usage information and the registration information for the first physical property item. This blockchain may be maintained by the decentralized peer-to-peer (P2P) network including platform 410 and other devices or computing platforms, as discussed below. Also, in one example, physical property management computing platform 410 may be operated by a financial institution such as a bank.

Then, in step 903, platform 410 may add a second new block to the blockchain based on the registration information and the historical usage information. Here, the second new block may include information to facilitate repair or replacement of the first physical property item. The information may include a description of any previous damage to the first physical property item. In one example, the information in the second new block may also pertain to a smart contract that executes when predetermined conditions are met. The smart contract may specify the types of damage for which repair or replacement is authorized and the acceptable cost for repairing the various types of specified damage or for replacing the first physical property item. For example, if the first physical property item corresponds to a network printer, then the smart contract added to the blockchain may specify that when the toner cartridge runs low, platform 410 should contact various vendors for replacement cartridges and should accept the lowest bid. The smart contract may further specify that the lowest bid should be accepted only when that lowest bid is below a predetermined amount. As another example, if the first physical property item corresponds to a vehicle, then the smart contract added to the blockchain may specify that when the vehicle needs an oil change or some other service, platform 410 should contact various vendors for determining bids based on their quality and reputation without regard to the price.

Figure 9B:
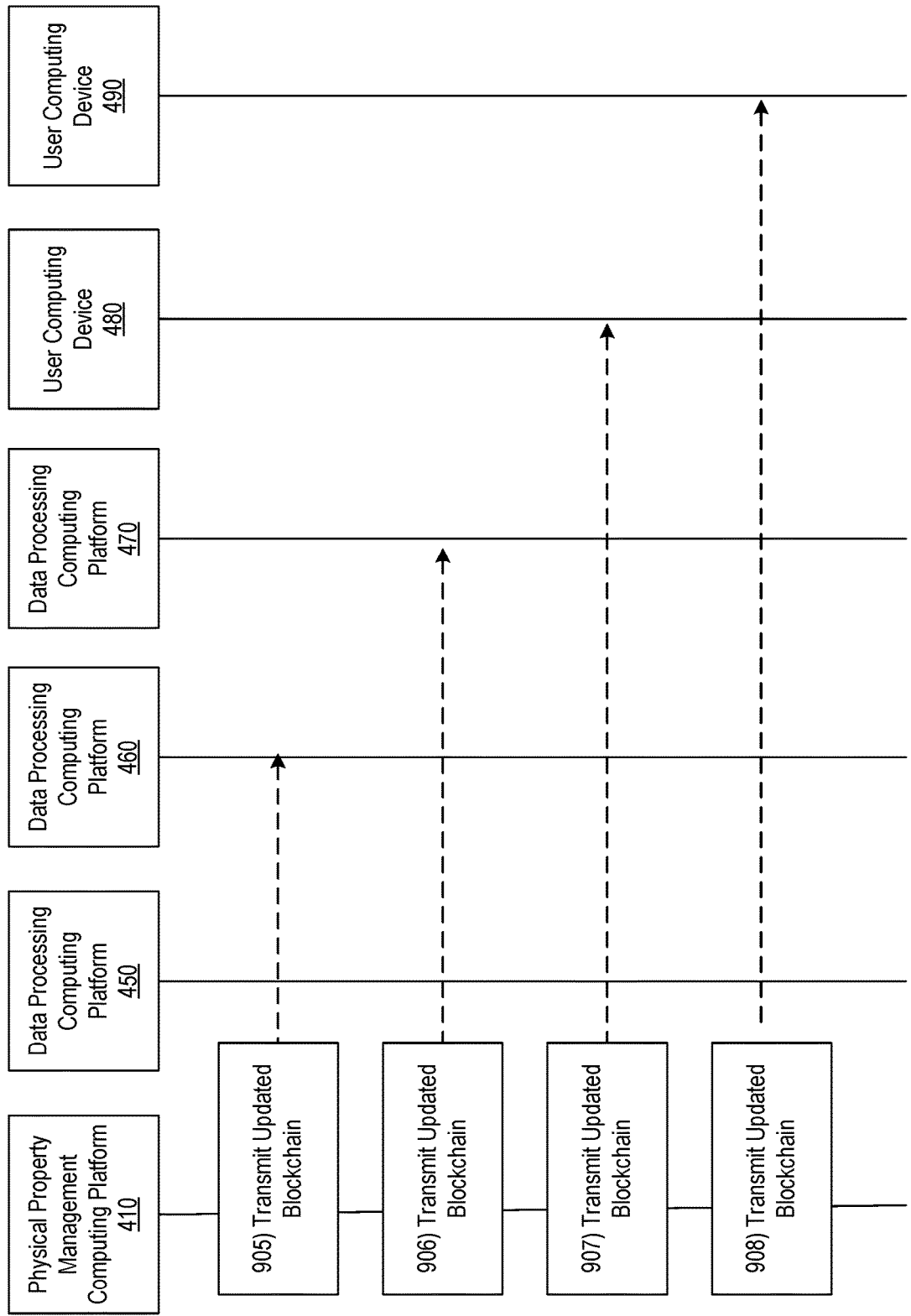

Referring to FIGS. 9A-9B, the process may then move to steps 904-908 where platform 410 may transmit the updated blockchain to each of data processing computing platforms 450-470 and user computing devices 480-490. Then, referring to FIG. 9C, platform 410 may, in step 909, analyze the historical usage information for the first physical property item to identify a quality metric of the first physical property item. In some aspects, the quality metric may relate to a physical condition of the first physical property item. For example, if the physical property item has experienced wear or tear (e.g., scratches, dents, defects, damage, and the like), platform 410 may identify the location of this damage and may use that information in assessing the physical condition of the first physical property item.

Then, in step 910, platform 410 may receive, from user computing device 490 associated with a second user, a user registration request for the first physical property item. In the user registration request, the second user may indicate that he wants the ability to initiate usage of the first physical property item upon request. Upon receiving the user registration request, platform 410 may verify that user computing device 490 is associated with a user that actually sent the request (e.g., by calling the user on a telephone number associated with user computing device 490). Once user computing device 490 has been authenticated, the process may move to step 911 where platform 410 may register user computing device 490 by adding a third new block to the blockchain associated with the first physical property item. The third new block may include information identifying the user computing device 490 as a device that should be given the ability to initiate usage of the first physical property item upon request. The blockchain associated with the first physical property item may indicate other devices and computing platforms that have the ability to initiate usage of the first physical property item.

Figure 9C:
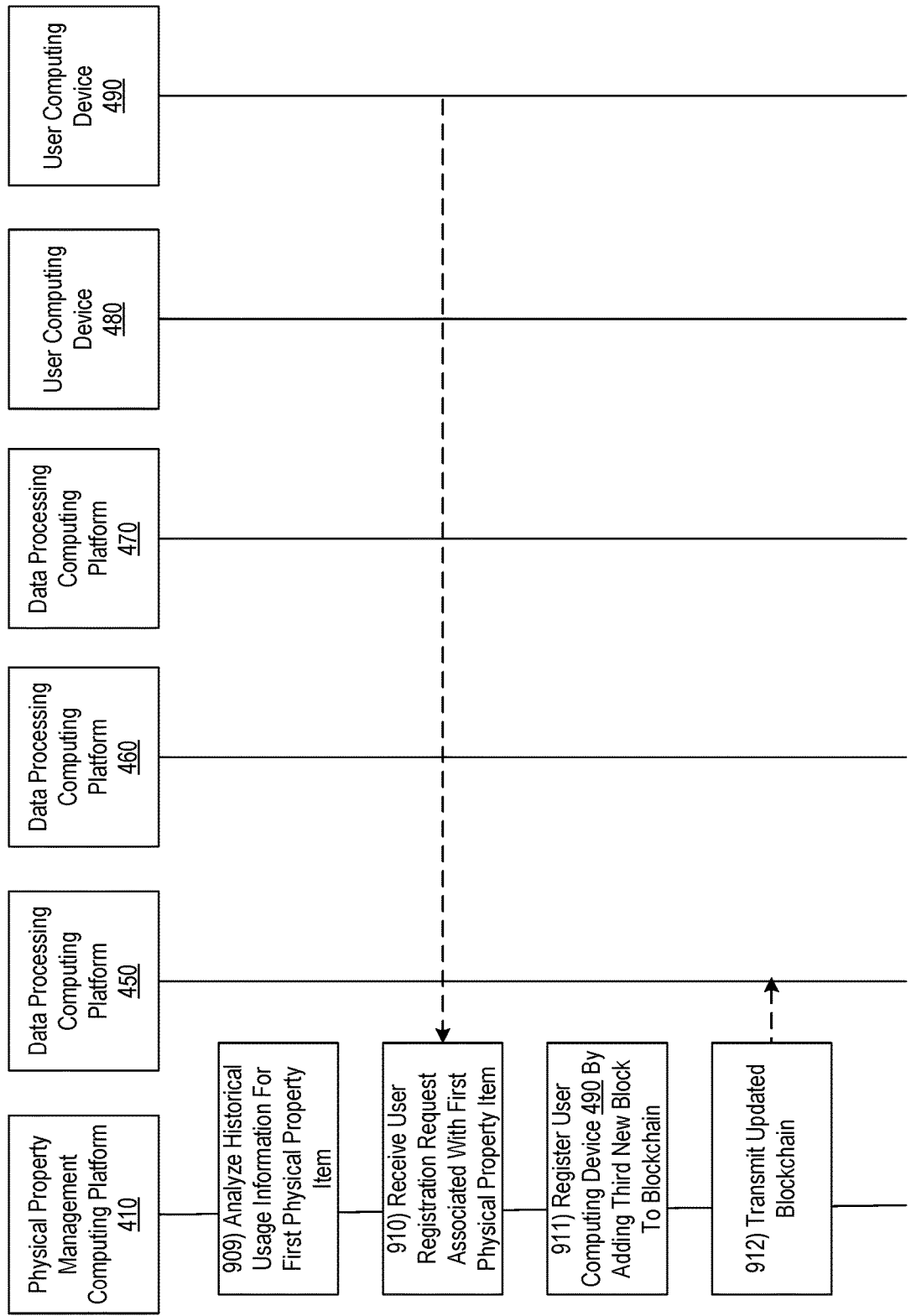
Figure 9D:
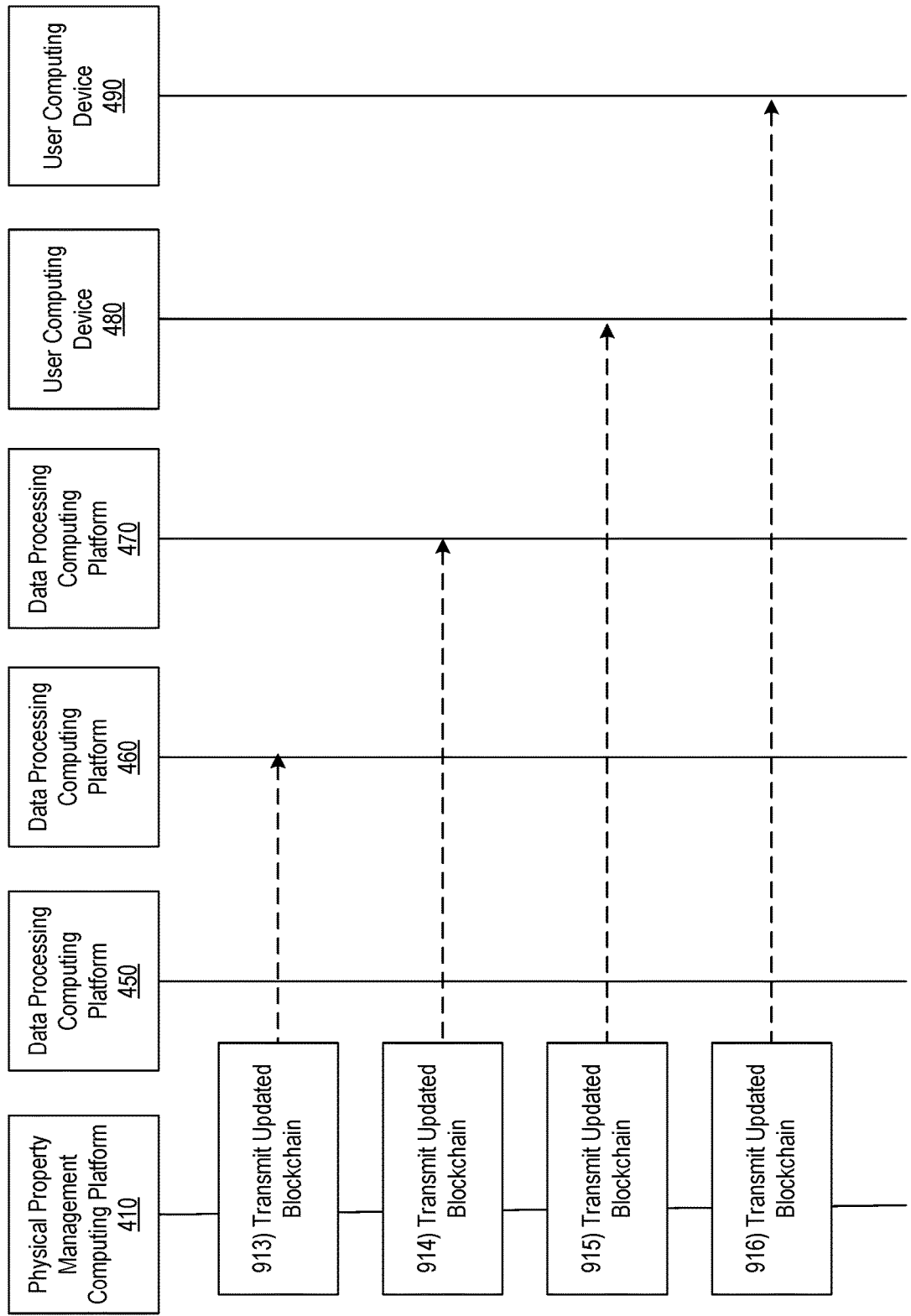
Figure 9E:
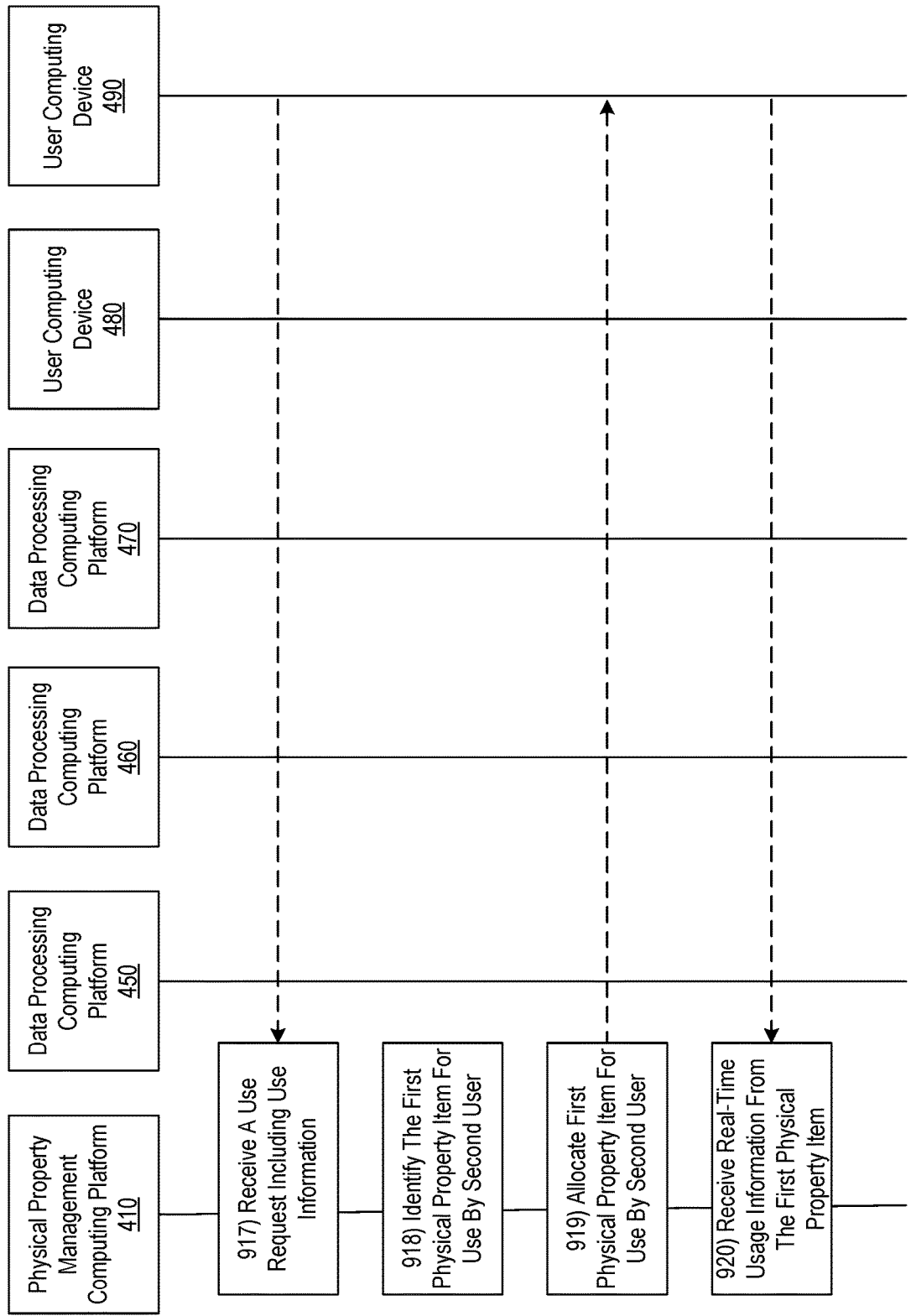

Referring to FIGS. 9C-9D, the process may then move to steps 912-916 where platform 410 may transmit the updated blockchain to data processing computing platforms 450-470 and user computing devices 480-490. Subsequently, in step 917, platform 410 may receive, from user computing device 490 associated with a second user, a use request including use information for using a physical property item associated with a first item type. The use information may include a proposed use for the first physical property item. The use request may further include a date that the use is requested and how long the user will need to use the item. For example, the user may request a vehicle for driving from Chicago to San Francisco within a one week period. The user may further specify that he needs a newer vehicle because he wants to minimize the risk of any problems with the vehicle during the trip.

Once the use request is received in step 917, platform 410 may then, in step 918, identify the first physical property item for use by the second user. In general, platform 410 may identify any available physical property item based on the information in the use request. For example, if the user requests a high quality vehicle, then platform 410 may determine that a vehicle manufactured two years ago with limited miles is appropriate for the intended use. As another example, if the user requests a network printer for a low quality print job, then platform 410 may identify a network printer that is suitable for this type of job.

Next, in step 919, platform 410 may allocate the first physical property item for use by the second user (assuming that the first physical property item has been identified by platform 410 for use by the second user). Allocation of the first physical property item to a given user may allow the user to use the first physical property item. For example, platform 410 may determine that a network printer should be allocated to the second user for a predetermined period of time. As another example, platform 410 may deliver a requested vehicle to the second user or provide a pickup location for a requested vehicle.

The process may then move to step 920 where platform 410 may receive real-time usage information from the first physical property item as the first physical property item is used by the second user. Here, the first physical property item may have a communications sensor that can directly transmit the real-time usage information to platform 410. In other examples, the first physical property item may first transmit the real-time usage information to user computing device 490 before user computing device 490 transmits the real-time usage information to platform 410. If the first physical property item corresponds to a vehicle, platform 410 may receive information about how the vehicle is being driven by the second user. Alternatively, if the first physical property item corresponds to a network printer, then platform 410 may receive information about the toner level or about how many pages have been printed as the printer is being used.

Figure 9F:
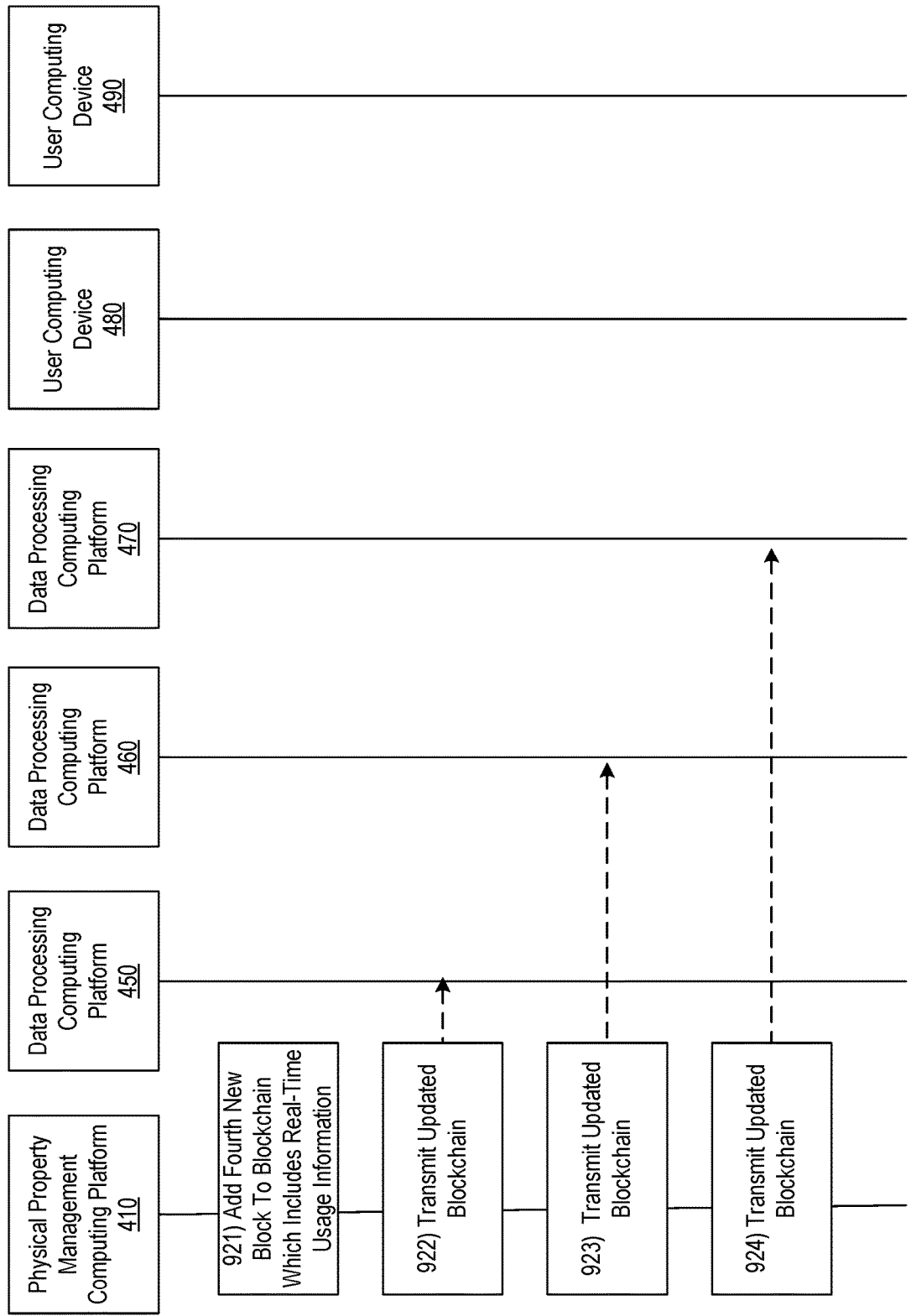
Figure 9G:
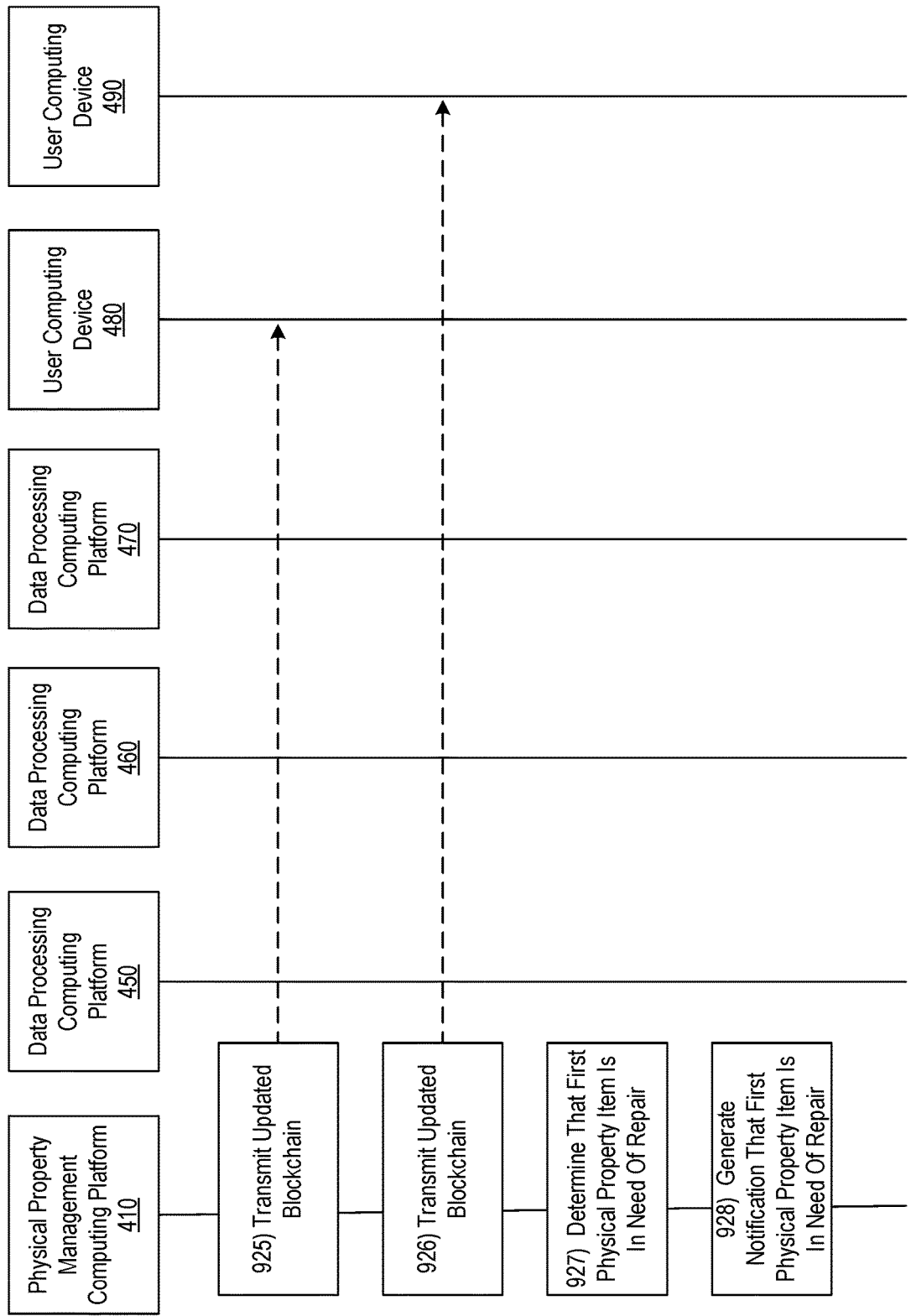

Referring to FIG. 9F, the process may then move to step 921 where platform 410 may add a fourth new block to the blockchain. The fourth new block may include the real-time usage information from the first physical property item. Subsequently, referring to FIGS. 9F-9G, platform 410 may transmit, in steps 922-926, the updated blockchain for the first physical property item to data processing computing platforms 450-470 and user computing devices 480-490.

Then, the process may move to step 927 where platform 410 may analyze the real-time usage information to determine that the first physical property item is in need of repair. For example, if the first physical property item is a vehicle, the real-time usage information may indicate the oil levels, tire pressure, or engine performance of the vehicle as it is being driven by the second user. Platform 410 may analyze that information to determine that the oil needs to be changed, the tire pressure needs to be modified, or that the engine needs a tune-up, among other things. As another example, if the first physical property item is a network printer, then the real-time usage information may indicate that there is a paper jam in the printer or that the toner cartridge needs to be changed. Platform 410 may analyze this information to take the appropriate action.

Figure 9H:
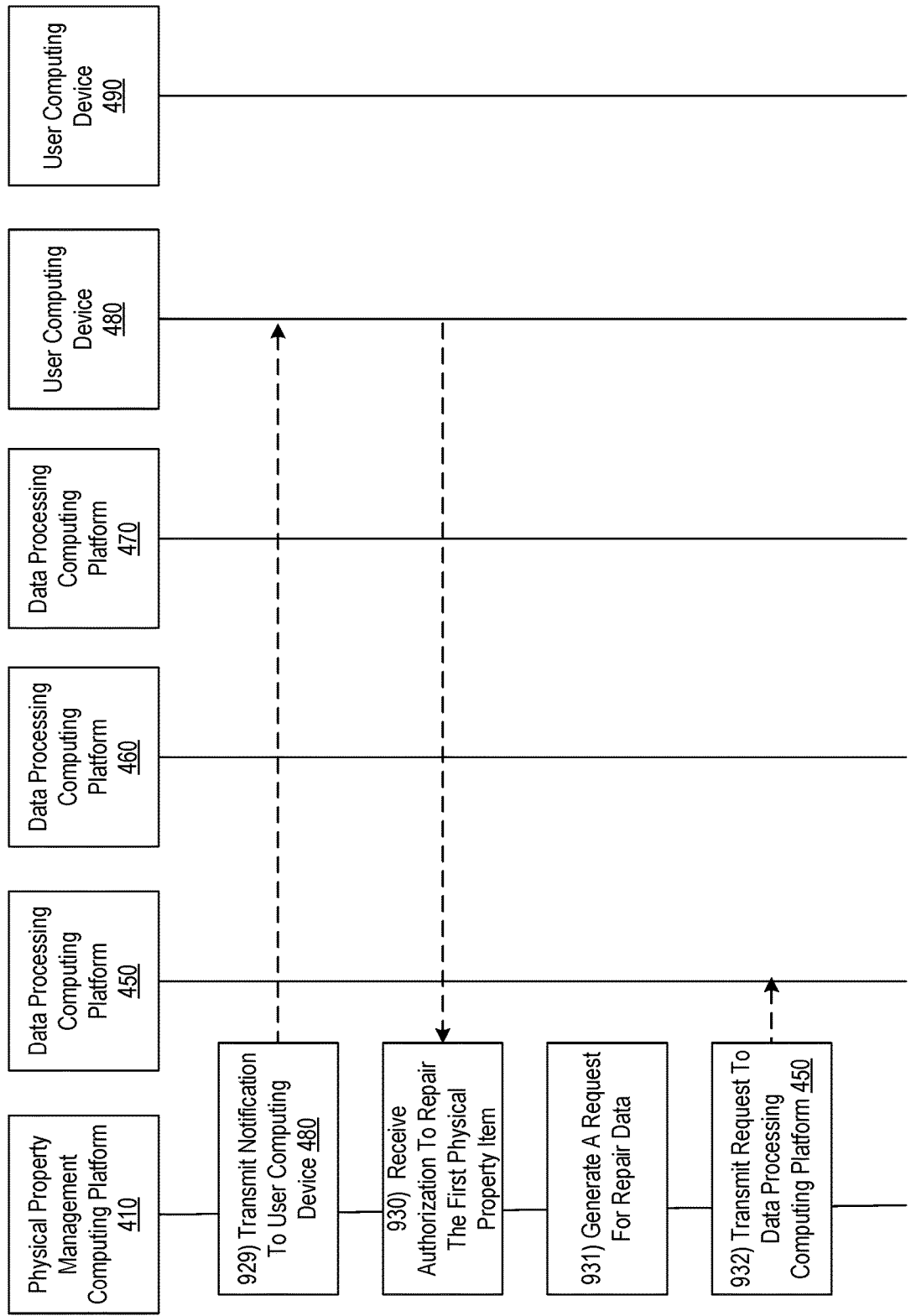

Then, in step 928, platform 410 may generate a notification indicating that the first physical property item is in need of repair and requesting authorization to repair the first physical property item. The notification may also include information related to what kind of repair is needed for the first physical property item. Referring to FIG. 9H, platform 410 may then transmit, in step 929, the notification to user computing device 480 (given that the request to register the first physical property item was received from user computing device 480). FIG. 10 depicts an example message transmitted from a physical property management computing platform indicating that a physical property item is in need of repair in accordance with one or more example embodiments. As shown in FIG. 10, message 1000 may include a date that the notification was sent, the registration information for the physical property item in question, and a description of the repair needed for the item. Message 1000 may further allow the recipient to either approve or reject the repair needed for the physical property item.

The user of user computing device 480 may consider the information in the notification to determine whether authorization should be given to repair the first physical property item. For example, the user may consider the extent of any damage to the first physical property item and whether the repair is cosmetic or impacts the functionality of the first physical property item. If the user of user computing device 480 does not provide authorization to repair the first physical property item, the process may end and platform 410 may not proceed with repairing the first physical property item. In step 930, assume here that the user of user computing device 480 transmits, to platform 410, a message with authorization to repair the first physical property item. Then platform 410 may generate, in step 931, a request for repair data. In one example, the request for repair data may include a description of the first physical property item, a description of the problem or damage to the first physical property item, and a request for a cost estimate for repairing or replacing the first physical property item. Then, referring to FIGS. 9H-9I, in steps 932-934, platform 410 may transmit the request for repair data to data processing computing platforms 450-470. FIG. 11 depicts an example message transmitted from a physical property management computing platform for requesting repair data in accordance with one or more example embodiments. As shown in FIG. 11, message 1100 may include a date that the request was sent, a description of the physical property item in question, a description of the repair needed to repair the item, and any conditions that must be met before a bid for repairing or replacing the physical property item would be considered by platform 410. Message 1100 may also allow the recipient to select an option for responding to the request for repair data.

Figure 9I:
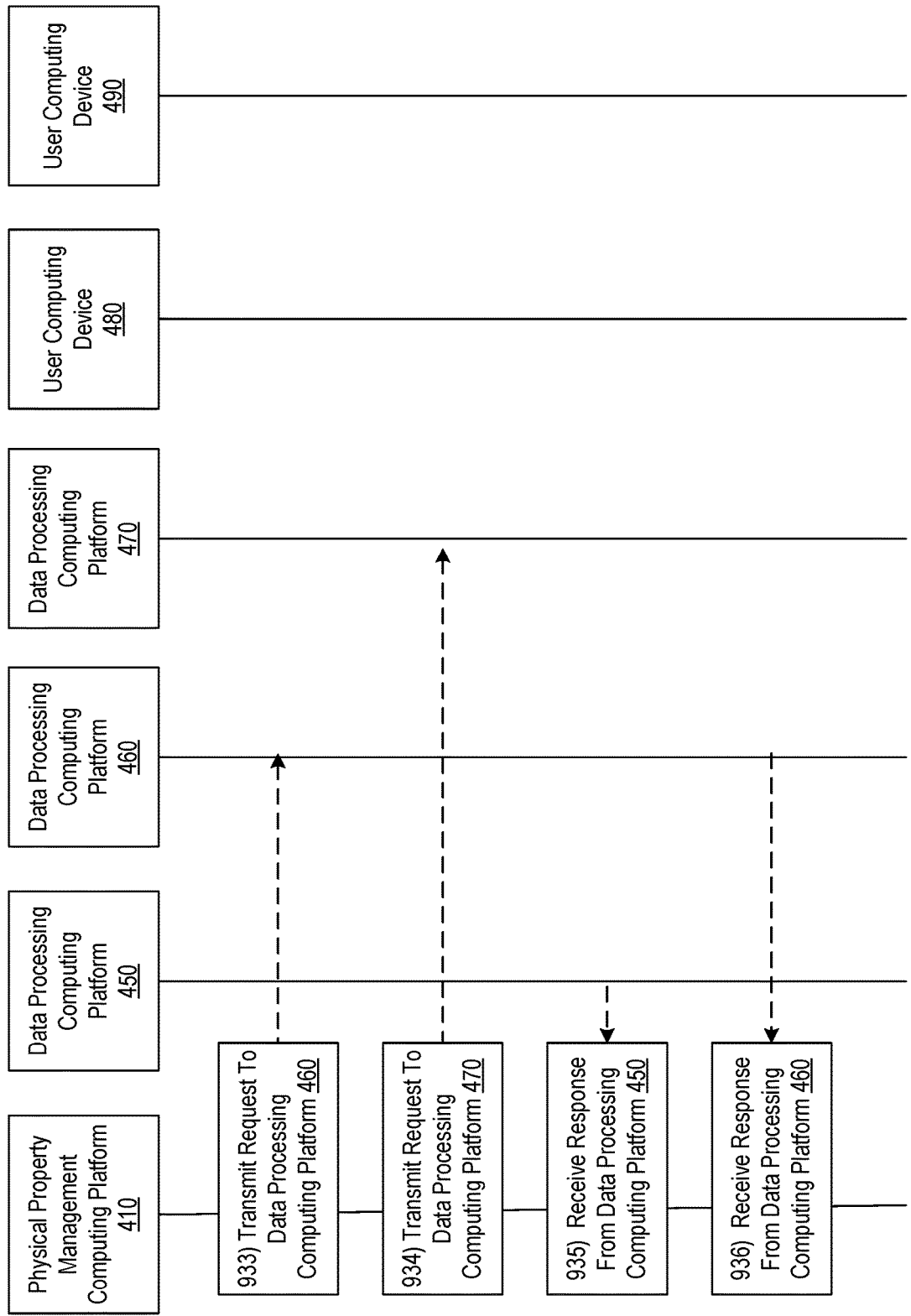
Figure 9J:
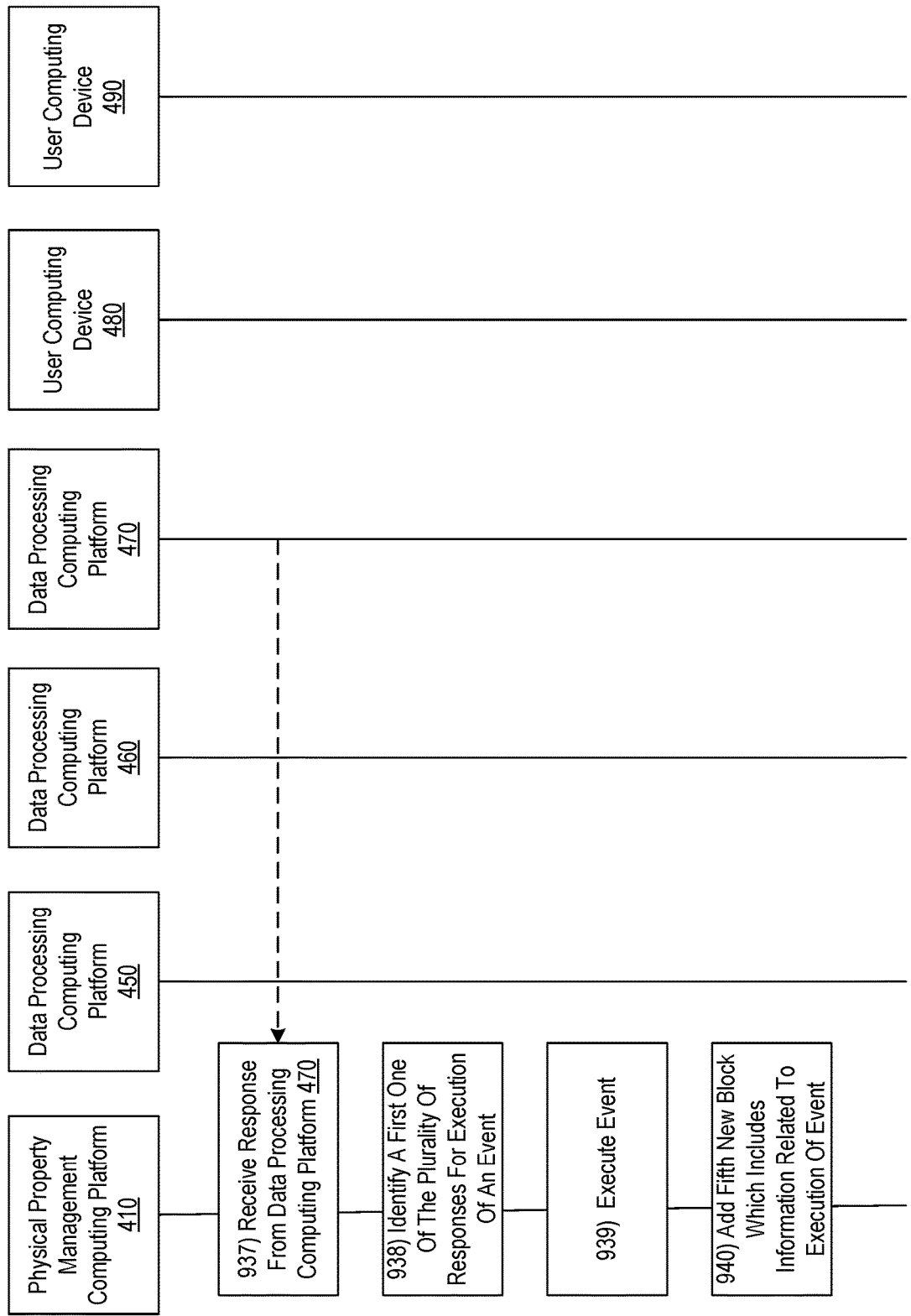

Platforms 450-470 may each evaluate the request for repair data to determine if they want to respond to the request. Referring to FIGS. 9I-9J, assume that in this example, platforms 450-470 decide to transmit a response in steps 935-937. The response may include a cost estimate for repairing the damage to the first physical property item or for replacing the first physical property item and any other relevant information, including an estimate of the amount of time needed for repair or replacement. In step 938, platform 410 may identify one of the responses for execution of an event associated with repair or replacement of the first physical property item. Platform 410 may base this identification on the information in the second new block. More specifically, platform 410 may base this identification on the information in a smart contract for repairing damage to the first property item or for replacing the first physical property item. For example, if the smart contract specified that a repair service provider should be chosen based on cost to repair the damage to the first physical property item, then platform 410 may choose the response from the repair service provider that provided the lowest cost estimate for repairing damage to the first physical property item. If, on the other hand, the smart contract specified that a repair service provider should be chosen based on additional metrics, such as the reputation of the service provider, then platform 410 may choose one of the responses based on these additional metrics. In addition, platform 410 may choose one of the responses based on whether the response indicates that the first physical property item needs to be repaired or replaced.

Then, in step 939, platform 410 may execute an event associated with the repair or replacement of the first physical property item. In one example, the event may be execution of the smart contract with respect to the identified response. In other words, an organization that operates platform 410 may enter into a contractual relationship (or the organization that operates platform 410 may cause the owner of the first physical property item to enter into a contractual relationship) with the chosen repair service provider to repair the damage to the first physical property item or to replace the first physical property item.

Figure 9L:
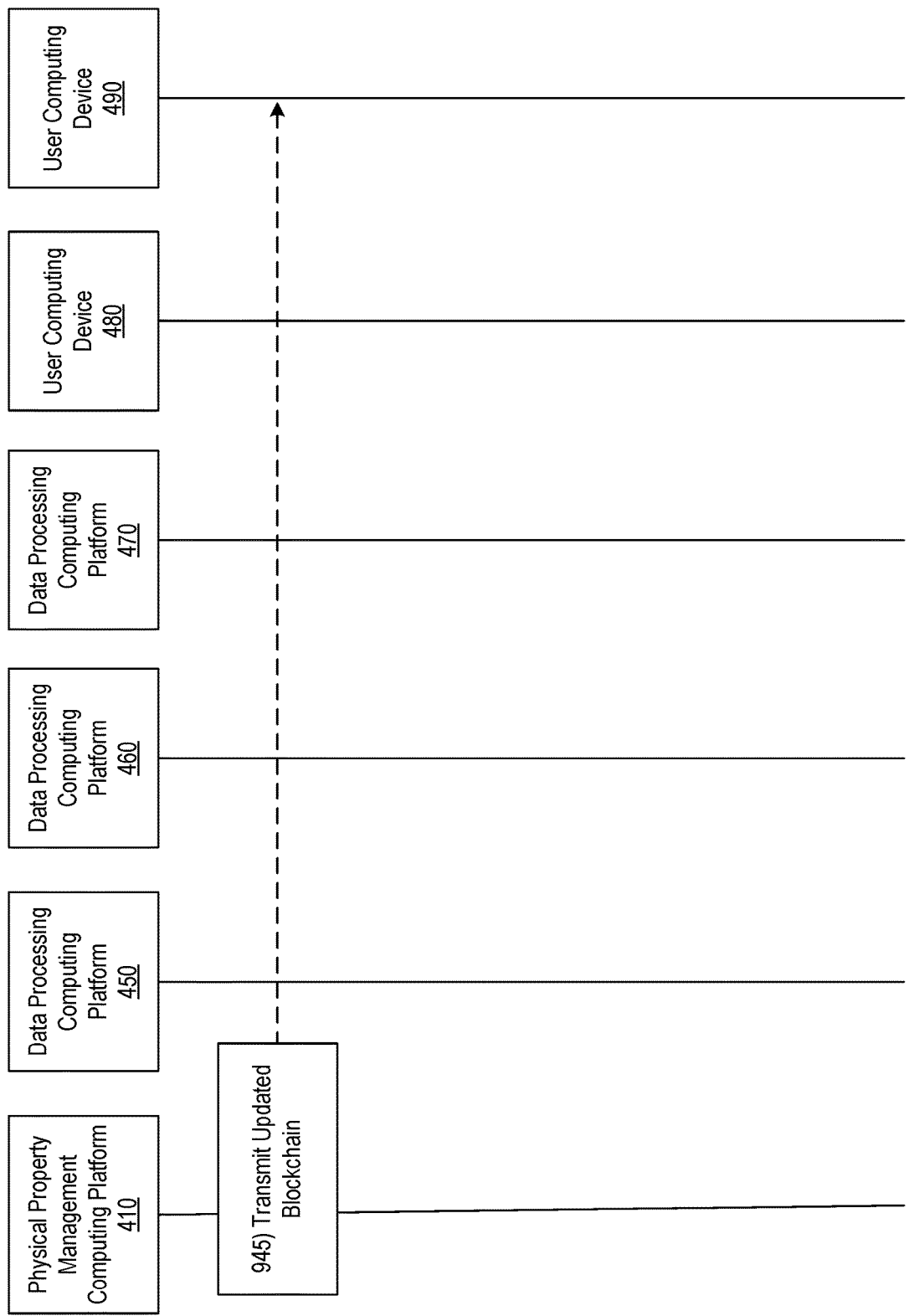

Next, in step 940, platform 410 may add a fifth new block to the blockchain associated with the first physical property item. Here, the fifth new block may include information related to execution of the event. In one example, the information related to the execution of the event may relate to the contractual relationship between an organization that operates platform 410 (or an owner of the first physical property item) and the chosen repair service provider (which operates the chosen data processing computing platform 450-470) for repairing damage to the first physical property item. Referring to FIGS. 9K-9L, platform 410 may then transmit, in steps 941-945, the updated blockchain to data processing computing platforms 450-470 and user computing devices 480-490.

Figure 12:
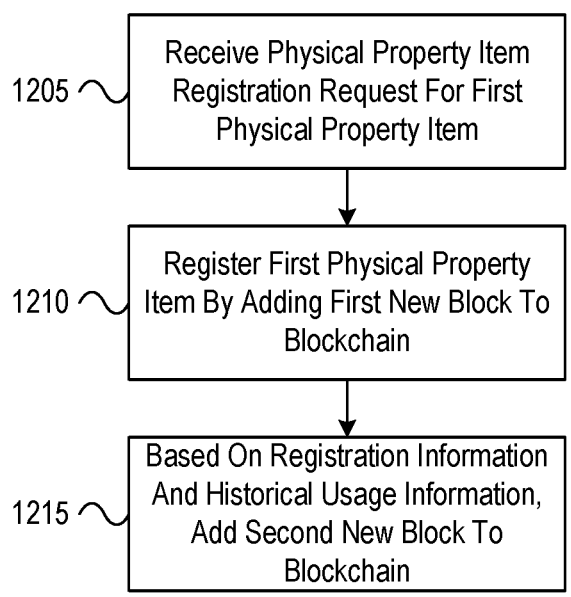
FIG. 12 depicts an illustrative method for execution of events related to property repair in accordance with one or more example embodiments.

FIG. 12 depicts an illustrative method for execution of events related to property repair in accordance with one or more example embodiments. Referring to FIG. 12, at step 1205, a computing device configured to operate in a decentralized peer-to-peer (P2P) network and including at least one or more processors and memory storing at least a portion of a blockchain of the decentralized P2P network may receive, from a first user computing device associated with a first user, a physical property item registration request for registering a first physical property item. The first physical property item may be associated with a first item type and the physical property item registration request may include historical usage information and registration information for the first physical property item. Subsequently, at step 1210, the computing device may register the first physical property item of a plurality of physical property items by adding a first new block to the blockchain. Here, the first new block may include the historical usage information and the registration information for the first physical property item. Finally, in step 1215, the computing device may add a second new block to the blockchain based on the registration information and the historical usage information. Here, the second new block may include information to facilitate repair of the first physical property item.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
at a computing device configured to operate as a full node in a decentralized peer-to-peer (P2P) network and including at least one or more processors and memory storing at least a portion of a blockchain of the decentralized P2P network:
executing network protocols to receive broadcast of a smart contract operation network function;
executing hash functions to generate a digest of the smart contract operation network function;
receiving, from a first user computing device associated with a first user, a physical property item registration request for registering a first physical property item, wherein the first physical property item is associated with a first item type corresponding to a computational resource available through the P2P network to a second user and wherein the physical property item registration request includes historical usage information and registration information for the first physical property item;
registering the first physical property item of a plurality of physical property items by adding a first new block to the blockchain, wherein the first new block includes the historical usage information and the registration information for the first physical property item;
based on the registration information and the historical usage information, adding a second new block to the blockchain, wherein the second new block includes information to facilitate repair of the first physical property item including damage information and wherein the second new block includes a smart contract that executes when predetermined conditions associated with cost to repair are met;
executing the smart contract based on one or more of the predetermined conditions included in the second block being met;
receiving, from a second user computing device associated with a second user, a user registration request associated with the first physical property item;
registering the second user computing device by adding a third new block to the blockchain, wherein the third new block includes information to allow the second user computing device to initiate usage of the first physical property item and wherein the second user computing device is one of a plurality of user computing devices that can initiate usage of the first physical property item;
receiving, from the second user computing device, a use request including use information for using a physical property item associated with the first item type;
based on the use information, identifying the first physical property item for use by the second user; and
allocating and allowing the second user to initiate use of the first physical property item.

2. The method of claim 1, further comprising:
analyzing the historical usage information for the first physical property item to identify a quality metric of the first physical property item.

3. The method of claim 1, further comprising:
receiving, from the first physical property item, real-time usage information as the first physical property item is used by the second user; and
adding a fourth new block to the blockchain, wherein the fourth new block includes the real-time usage information from the first physical property item.

4. The method of claim 3, further comprising:
analyzing the real-time usage information to determine that the first physical property item is in need of repair.

5. The method of claim 4, further comprising: generating a notification indicating that the first physical property item is in need of repair and requesting authorization to repair the first physical property item.

6. The method of claim 5, further comprising: transmitting, to the first user computing device, the notification indicating that the first physical property item is in need of repair and requesting authorization to repair the first physical property item.

7. The method of claim 6, further comprising: receiving, from the first user computing device, authorization to repair the first physical property item.

8. The method of claim 7, further comprising:
generating a request for repair data from a plurality of data processing computing platforms;
transmitting the request to the plurality of data processing computing platforms;
receiving a plurality of responses from the plurality of data processing computing platforms; and
based on the information in the second new block and the plurality of responses, identifying a first one of the plurality of responses for execution of an event associated with the repair of the first physical property item; and
executing the event associated with the repair of the first physical property item.

9. The method of claim 8, wherein the request for repair data includes the historical usage information and the real-time usage information.

10. The method of claim 9, further comprising: adding a fifth new block to the blockchain, wherein the fifth new block includes information related to execution of the event.

11. A computing device configured to operate as a full node in a decentralized peer-to-peer (P2P) network, comprising:
one or more processors; and
memory storing at least a portion of a blockchain of the decentralized P2P network and computer-readable instructions that, when executed by the one or more processors, cause the computing device to:
execute network protocols to receive broadcast of a smart contract operation network function;
execute hash functions to generate a digest of the smart contract operation network function;
receive, from a first user computing device associated with a first user, a physical property item registration request for registering a first physical property item, wherein the first physical property item is associated with a first item type corresponding to a computational resource available through the P2P network to a second user and wherein the physical property item registration request includes historical usage information and registration information for the first physical property item;
register the first physical property item of a plurality of physical property items by adding a first new block to the blockchain, wherein the first new block includes the historical usage information and the registration information for the first physical property item;
based on the registration information and the historical usage information, add a second new block to the blockchain, wherein the second new block includes information to facilitate repair of the first physical property item including damage information and wherein the second new block includes a smart contract that executes when predetermined conditions associated with cost to repair are met;
execute the smart contract based on one or more of the predetermined conditions included in the second block being met;
receive, from a second user computing device associated with a second user, a user registration request associated with the first physical property item;
register the second user computing device by adding a third new block to the blockchain, wherein the third new block includes information to allow the second user computing device to initiate usage of the first physical property item and wherein the second user computing device is one of a plurality of user computing devices that can initiate usage of the first physical property item;
receive, from the second user computing device, a use request including use information for using a physical property item associated with the first item type;
based on the use information, identify the first physical property item for use by the second user; and
allocate and allow the second user to initiate use of the first physical property item.

12. The computing device of claim 11, wherein the memory stores further instructions that, when executed by the one or more processors, cause the computing device to:
analyze the historical usage information for the first physical property item to identify a quality metric of the first physical property item.

13. The computing device of claim 11, wherein the memory stores further instructions that, when executed by the one or more processors, cause the computing device to:
receive, from the first physical property item, real-time usage information as the first physical property item is used by the second user; and
add a fourth new block to the blockchain, wherein the fourth new block includes the real-time usage information from the first physical property item.

14. The computing device of claim 13, wherein the memory stores further instructions that, when executed by the one or more processors, cause the computing device to:
analyze the real-time usage information to determine that the first physical property item is in need of repair.

15. The computing device of claim 14, wherein the memory stores further instructions that, when executed by the one or more processors, cause the computing device to:
generate a notification indicating that the first physical property item is in need of repair and request authorization to repair the first physical property item.

16. One or more non-transitory computer-readable media storing instructions that, when executed by a computing device configured to operate as a full node in a decentralized peer-to-peer (P2P) network, the computing device including at least one or more processors and memory storing at least a portion of a blockchain of the decentralized P2P network, cause the computing device to:
execute network protocols to receive broadcast of a smart contract operation network function;
execute hash functions to generate a digest of the smart contract operation network function;
receive, from a first user computing device associated with a first user, a physical property item registration request for registering a first physical property item, wherein the first physical property item is associated with a first item type corresponding to a computational resource available through the P2P network to a second user and wherein the physical property item registration request includes historical usage information and registration information for the first physical property item;
register the first physical property item of a plurality of physical property items by adding a first new block to the blockchain, wherein the first new block includes the historical usage information and the registration information for the first physical property item;
based on the registration information and the historical usage information, add a second new block to the blockchain, wherein the second new block includes information to facilitate repair of the first physical property item including damage information and wherein the second block includes a smart contract that executes when predetermined conditions associated with cost to repair are met;
execute the smart contract based on one or more of the predetermined conditions included in the second block being met;
receive, from a second user computing device associated with a second user, a user registration request associated with the first physical property item;
register the second user computing device by adding a third new block to the blockchain, wherein the third new block includes information to allow the second user computing device to initiate usage of the first physical property item and wherein the second user computing device is one of a plurality of user computing devices that can initiate usage of the first physical property item;
receive, from the second user computing device, a use request including use information for using a physical property item associated with the first item type;
based on the use information, identify the first physical property item for use by the second user; and
allocate and allow the second user to initiate use of the first physical property item.

17. The one or more non-transitory computer-readable media of claim 16, wherein the instructions, when executed by the computing device configured to operate in the decentralized P2P network, the computing device including at least the one or more processors and the memory storing at least the portion of the blockchain of the decentralized P2P network, further cause the computing device to:
analyze the historical usage information for the first physical property item to identify a quality metric of the first physical property item.

18. The one or more non-transitory computer-readable media of claim 16, wherein the instructions, when executed by the computing device configured to operate in the decentralized P2P network, the computing device including at least the one or more processors and the memory storing at least the portion of the blockchain of the decentralized P2P network, further cause the computing device to:
receive, from the first physical property item, real-time usage information as the first physical property item is used by the second user; and
add a fourth new block to the blockchain, wherein the fourth new block includes the real-time usage information from the first physical property item.

19. The one or more non-transitory computer-readable media of claim 18, wherein the instructions, when executed by the computing device configured to operate in the decentralized P2P network, the computing device including at least the one or more processors and the memory storing at least the portion of the blockchain of the decentralized P2P network, further cause the computing device to:
analyze the real-time usage information to determine that the first physical property item is in need of repair.

20. The one or more non-transitory computer-readable media of claim 19, wherein the instructions, when executed by the computing device configured to operate in the decentralized P2P network, the computing device including at least the one or more processors and the memory storing at least the portion of the blockchain of the decentralized P2P network, further cause the computing device to:
generate a notification indicating that the first physical property item is in need of repair and request authorization to repair the first physical property item.

* * * * *